United States Patent
Huang et al.

(10) Patent No.: US 11,388,733 B2
(45) Date of Patent: Jul. 12, 2022

(54) METHOD AND APPARATUS FOR HANDLING SIDELINK FEEDBACK COLLISION IN A WIRELESS COMMUNICATION SYSTEM

(71) Applicant: ASUSTek Computer Inc., Taipei (TW)

(72) Inventors: Chun-Wei Huang, Taipei (TW); Li-Chih Tseng, Taipei (TW); Ming-Che Li, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 67 days.

(21) Appl. No.: 16/713,394

(22) Filed: Dec. 13, 2019

(65) Prior Publication Data

US 2020/0205166 A1 Jun. 25, 2020

Related U.S. Application Data

(60) Provisional application No. 62/782,768, filed on Dec. 20, 2018.

(51) Int. Cl.
*H04W 72/10* (2009.01)
*H04W 76/27* (2018.01)
(Continued)

(52) U.S. Cl.
CPC ........... *H04W 72/10* (2013.01); *H04L 1/1819* (2013.01); *H04L 5/0055* (2013.01);
(Continued)

(58) Field of Classification Search
CPC . H04W 72/10; H04W 72/0453; H04W 92/18; H04W 72/00; H04L 5/0055
See application file for complete search history.

(56) References Cited

U.S. PATENT DOCUMENTS

| 2016/0044552 A1* | 2/2016 | Heo | H04L 5/0032 370/331 |
| 2016/0066356 A1* | 3/2016 | Lindoff | H04W 72/1257 370/329 |

(Continued)

FOREIGN PATENT DOCUMENTS

| CN | 102420684 A | 4/2012 |
| CN | 106416095 A | 2/2017 |

(Continued)

OTHER PUBLICATIONS

Corresponding Korean Patent Application No. 10-2019-0166738, Office Action dated May 25, 2021. English Translation.

(Continued)

*Primary Examiner* — Jael M Ulysse
(74) *Attorney, Agent, or Firm* — Cooper Legal Group LLC

(57) ABSTRACT

A method and apparatus are disclosed. In an example, a first user equipment (UE) may be configured with a first number of carriers corresponding to a maximum number of carriers that the first UE is able to use concurrently and/or transmit on concurrently. The first UE may receive a plurality of sidelink transmissions on a plurality of carriers. The first UE may derive a plurality of slots for transmitting Physical Sidelink Feedback Channels (PSFCHs) based upon resources associated with the plurality of sidelink transmissions. Responsive to determining that a number of carriers of a second plurality of carriers associated with derived transmissions of the PSFCHs exceeds the first number of carriers, the first UE may prioritize one or more PSFCHs of the PSFCHs based upon a rule. The plurality of slots for transmitting the PSFCHs may be at least partially overlapped in the time domain.

20 Claims, 13 Drawing Sheets

(51) Int. Cl.
  *H04L 1/18* (2006.01)
  *H04L 5/00* (2006.01)
  *H04W 68/00* (2009.01)
  *H04W 72/04* (2009.01)
  *H04W 92/18* (2009.01)

(52) U.S. Cl.
  CPC ..... *H04W 68/005* (2013.01); *H04W 72/0446* (2013.01); *H04W 72/0453* (2013.01); *H04W 76/27* (2018.02); *H04W 92/18* (2013.01)

(56) References Cited

U.S. PATENT DOCUMENTS

| | | | |
|---|---|---|---|
| 2016/0205717 A1* | 7/2016 | Kazmi | H04W 76/16 |
| | | | 455/435.2 |
| 2016/0302250 A1* | 10/2016 | Sheng | H04W 4/70 |
| 2016/0337839 A1* | 11/2016 | Chae | H04W 72/1289 |
| 2016/0338122 A1* | 11/2016 | Tsai | H04W 76/14 |
| 2017/0041902 A1* | 2/2017 | Sheng | H04W 76/36 |
| 2017/0295553 A1* | 10/2017 | Lee | H04W 56/001 |
| 2018/0049193 A1* | 2/2018 | Belleschi | H04W 72/0446 |
| 2018/0049219 A1* | 2/2018 | Gupta | H04W 72/1247 |
| 2018/0070264 A1* | 3/2018 | Saiwai | H04W 72/04 |
| 2018/0121466 A1 | 5/2018 | Aguilera et al. | |
| 2018/0139724 A1* | 5/2018 | Loehr | H04W 72/02 |
| 2018/0139769 A1* | 5/2018 | Lee | H04L 5/0094 |
| 2018/0152272 A1* | 5/2018 | Chae | H04L 5/0032 |
| 2018/0167904 A1* | 6/2018 | Lee | H04W 72/042 |
| 2018/0167988 A1* | 6/2018 | Jung | H04W 76/14 |
| 2018/0234995 A1 | 8/2018 | Jung et al. | |
| 2018/0270722 A1* | 9/2018 | Kim | H04W 36/08 |
| 2018/0338300 A1* | 11/2018 | Lee | H04L 67/12 |
| 2019/0045465 A1* | 2/2019 | Lee | H04W 92/18 |
| 2019/0075548 A1* | 3/2019 | Lee | H04W 52/346 |
| 2019/0222979 A1* | 7/2019 | Hahn | H04W 72/0453 |
| 2019/0239039 A1* | 8/2019 | Hahn | H04W 28/08 |
| 2019/0239112 A1* | 8/2019 | Rao | H04W 28/06 |
| 2019/0289627 A1* | 9/2019 | Blasco Serrano | H04W 76/14 |
| 2020/0053524 A1* | 2/2020 | Novlan | H04W 72/0406 |
| 2020/0053675 A1* | 2/2020 | Khoryaev | H04L 5/0051 |
| 2020/0127800 A1* | 4/2020 | Tang | H04L 5/0037 |
| 2020/0195389 A1* | 6/2020 | Basu Mallick | H04W 72/02 |
| 2021/0160819 A1* | 5/2021 | Kim | H04W 72/1242 |

FOREIGN PATENT DOCUMENTS

| | | |
|---|---|---|
| KR | 20150128261 A | 11/2015 |
| WO | 2011/010863 A2 | 1/2011 |
| WO | 2014/154085 A1 | 2/2014 |
| WO | 2014/185840 A1 | 11/2014 |
| WO | 2015/050064 A1 | 4/2015 |
| WO | 2017/168391 A1 | 10/2017 |
| WO | 2017/1715528 A1 | 10/2017 |
| WO | 2017168391 A1 | 10/2017 |
| WO | 2017/0192009 A1 | 11/2017 |

OTHER PUBLICATIONS

EP Search Report in EP Application No. 19215896.2 dated Jul. 15, 2020, 16 pgs.

* cited by examiner

US 11,388,733 B2

METHOD AND APPARATUS FOR HANDLING SIDELINK FEEDBACK COLLISION IN A WIRELESS COMMUNICATION SYSTEM

CROSS-REFERENCE TO RELATED APPLICATIONS

The present application claims the benefit of U.S. Provisional Patent Application Ser. No. 62/782,768 filed on Dec. 20, 2018, the entire disclosure of which is incorporated herein in its entirety by reference.

FIELD

This disclosure generally relates to wireless communication networks, and more particularly, to a method and apparatus for handling sidelink feedback collision in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example, a first user equipment (UE) may be configured to perform one or more sidelink transmissions on a plurality of carriers. The first UE may transmit a first message, indicative of one or more candidate carriers of the plurality of carriers, to a second UE.

In an example, a first UE may be configured to perform one or more sidelink transmissions on a plurality of carriers. The first UE may be configured with a first number of carriers corresponding to a maximum number of carriers that the first UE is able to use concurrently and/or transmit on concurrently. The first UE may receive a first sidelink transmission on a first carrier of the plurality of carriers. The first UE may derive a first slot for transmitting a first Physical Sidelink Feedback Channel (PSFCH) based upon a first resource associated with the first sidelink transmission. The first UE may receive a second sidelink transmission on a second carrier of the plurality of carriers. The first UE may derive a second slot for transmitting a second PSFCH based upon a second resource associated with the second sidelink transmission. At least a part of the first slot may overlap with at least a part of the second slot in the time domain. Responsive to determining that a number of carriers of a second plurality of carriers associated with derived transmissions of a plurality of PSFCHs exceeds the first number of carriers, the first UE may prioritize the first PSFCH or the second PSFCH based upon a rule. The plurality of PSFCHs may comprise the first PSFCH and the second PSFCH. A plurality of slots for transmitting the derived transmissions of the plurality of PSFCHs may be at least partially overlapped in the time domain.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) Long Term Evolution (LTE) wireless access, 3GPP LTE-A or Long Term Evolution Advanced (LTE-Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.3.0, 3rd Generation Partnership Project, Technical Specification Group Radio Access Network, NR, Physical channels and modulation (Release 15); R1-1814276, Correction on resource exclusion procedure for V2X Phase 2, LG Electronics; 3GPP TS 36.213 V15.3.0, 3rd Generation Partnership Project, Technical Specification Group Radio Access Network, Evolved Universal Terrestrial Radio Access (E-UTRA), Physical layer procedure (Release 15); Final Report of 3GPP TSG RAN WG1#94 v1.0.0 (Gothenburg, Sweden, 20-24 Aug. 2018); Final Report of 3GPP TSG RAN WG1#94bis v1.0.0 (Chengdu, China, 8-12 Oct. 2018); Draft Report of 3GPP TSG RAN WG1#95 v0.2.0 (Spokane, USA, 12-16 Nov. 2018); Final Report of 3GPP TSG RAN WG1#88 v1.0.0; Final Report of 3GPP TSG RAN WG1#91 v1.0.0; R1-1812364, Discussion on physical layer structure for NR sidelink, MediaTek Inc.; R1-1814265, Updated feature lead summary for agenda item 7.2.4.1.2 Physical layer procedures, LG Electronics. The standards and documents listed above are hereby expressly incorporated by reference in their entirety.

Figure 1:
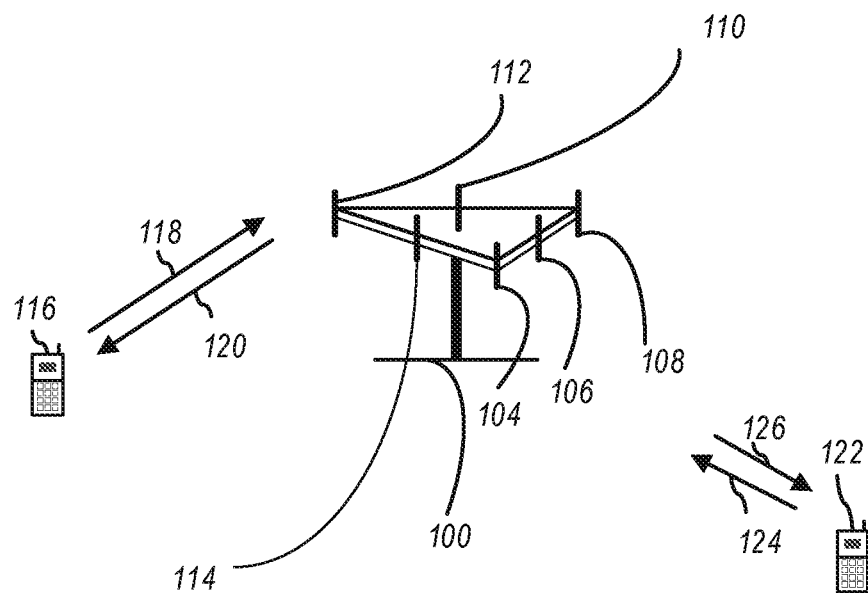
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), or some other terminology. An access terminal (AT) may also be called user equipment (UE), a wireless communication device, terminal, access terminal or some other terminology.

Figure 2:
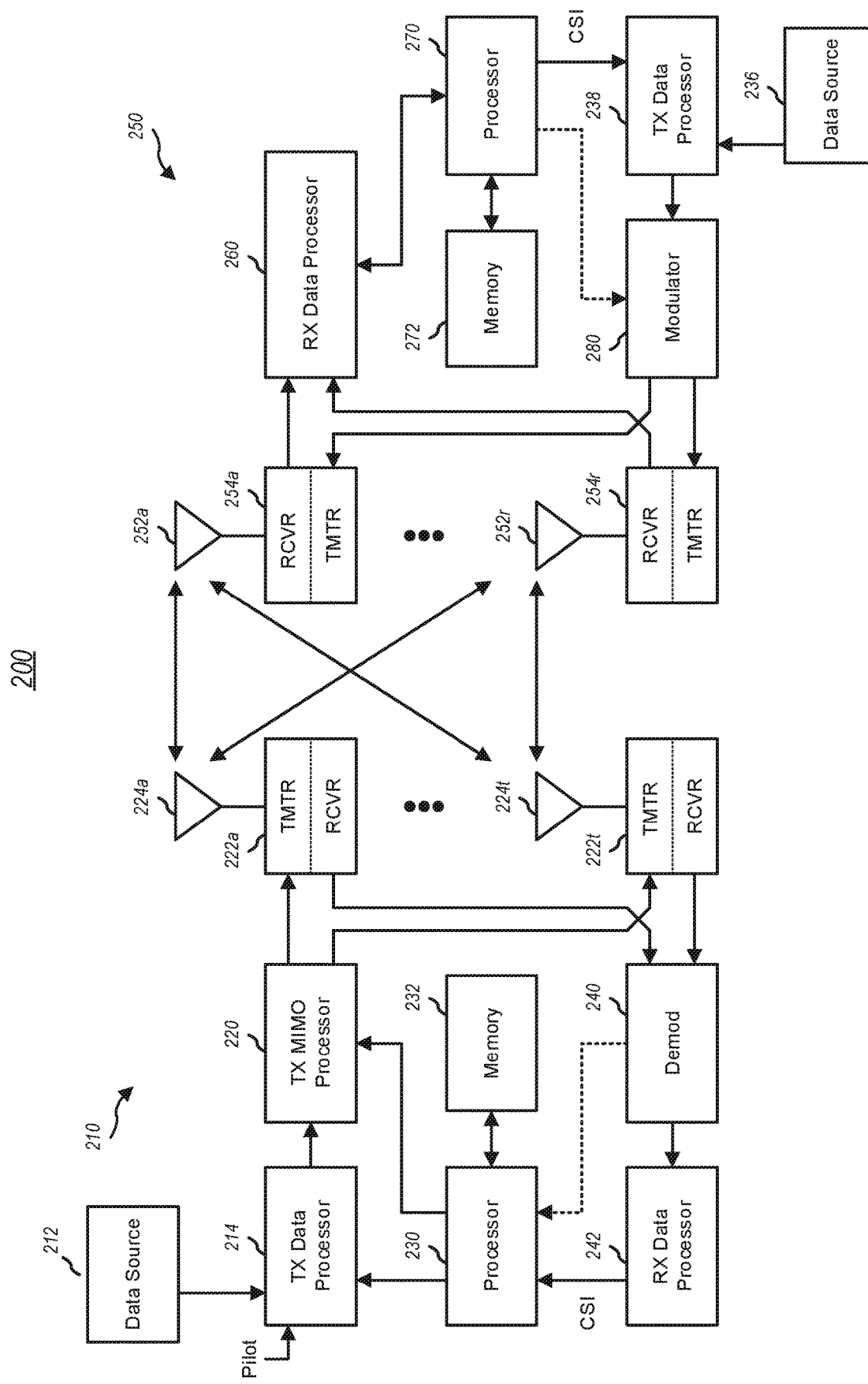
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 may then determine which pre-coding matrix to use for determining the beamforming weights and may then process the extracted message.

Figure 3:
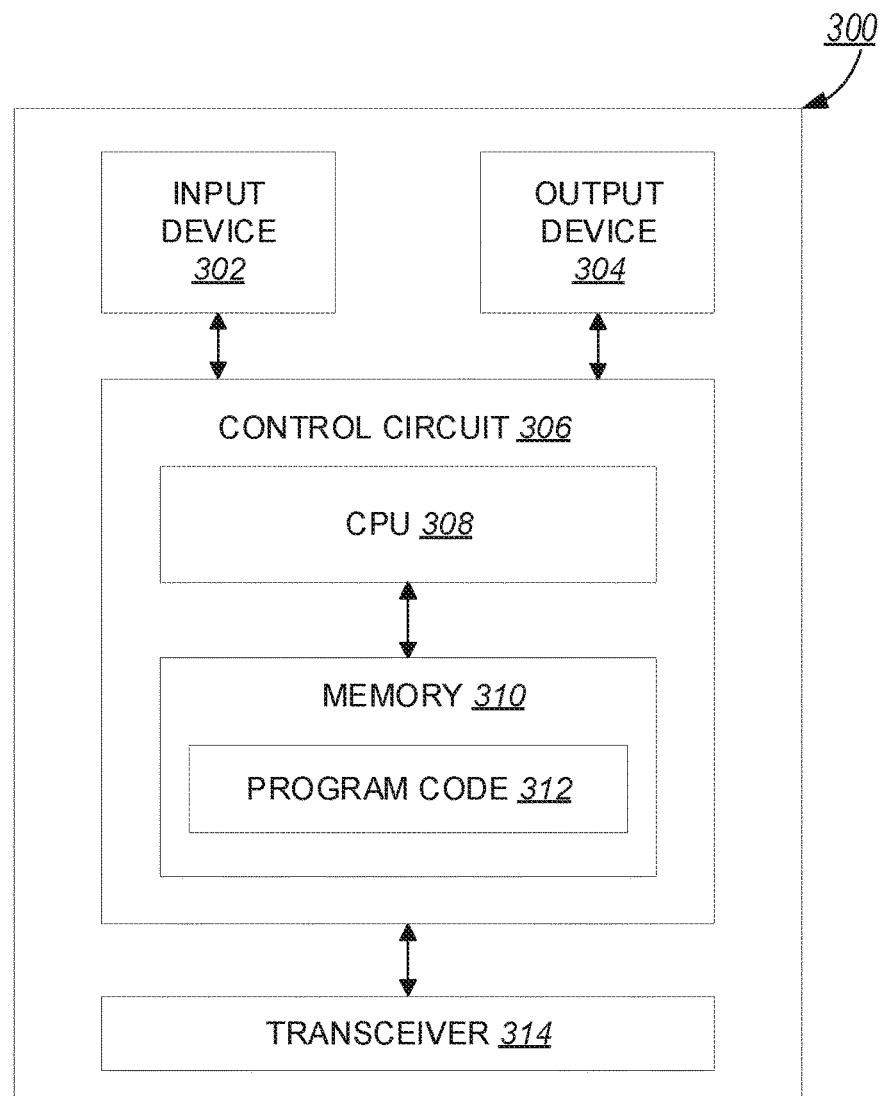
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
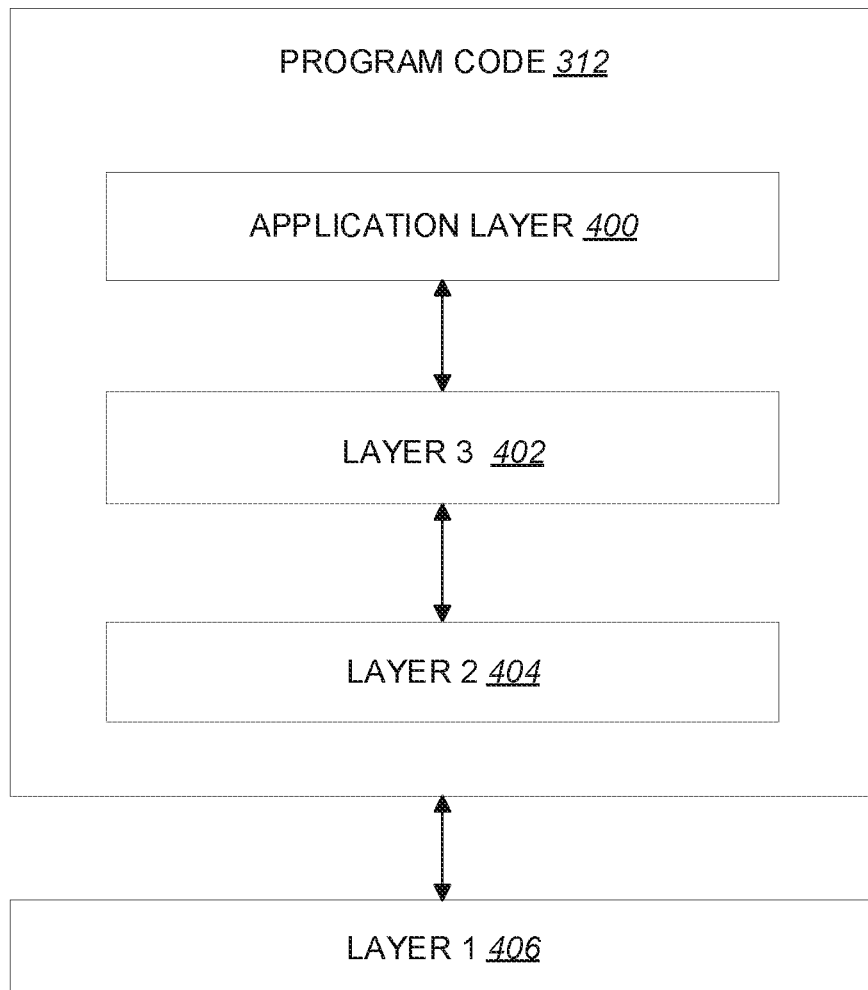
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
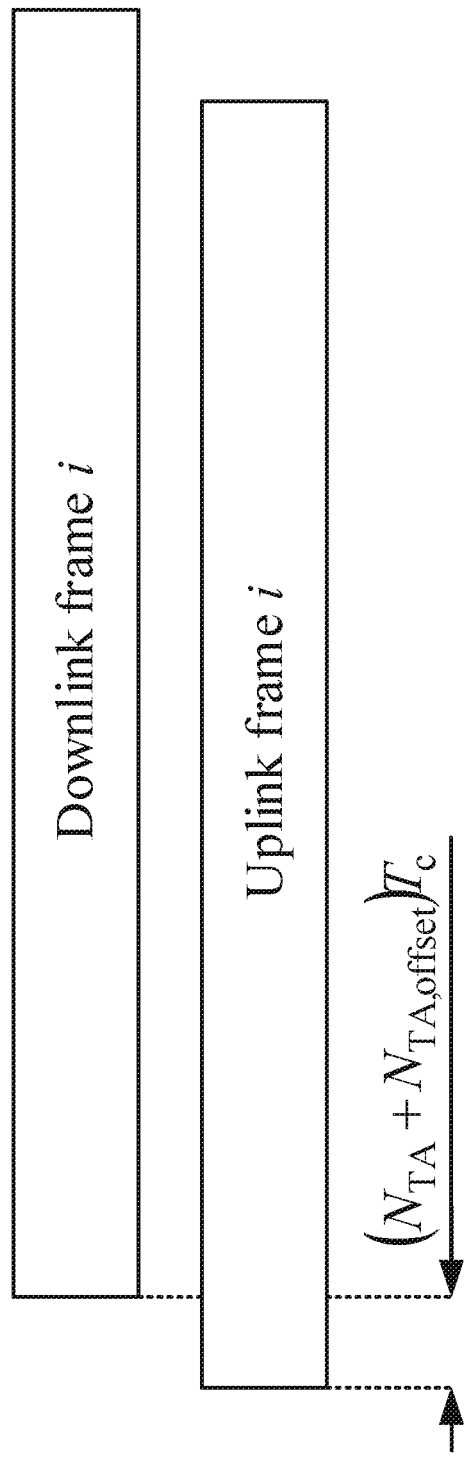
FIG. 5 illustrates a timing relation of an uplink frame and a downlink frame.

In 3GPP TS 38.211 V15.3.0, frame structure related concept is quoted. Notably, FIG. 4.3.1-1 of Section 4.3.1 of 3GPP TS 38.211 V15.3.0, entitled "Uplink-downlink timing relation", is reproduced herein as FIG. 5.

Frame Structure and Physical Resources

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

In R1-1814276, UE's sidelink capability related concept are quoted.

14 UE Procedures Related to Sidelink

Unchanged Parts are Omitted 14.1.1.6 UE Procedure for Determining the Subset of Resources to be Reported to Higher Layers in PSSCH Resource Selection in Sidelink Transmission Mode 4

When requested by higher layers in subframe n for a carrier, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:
1) A candidate single-subframe resource for PSSCH transmission $R_{x,y}$ is defined as a set of $L_{subCH}$ contiguous sub-channels with sub-channel x+j in subframe $t_y^{SL}$ where $j=0, \ldots, L_{subCH}-1$. The UE shall assume that any set of $L_{subCH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
2) The UE shall monitor subframes $t_{n'-10 \times P_{step}}^{SL}$, $t_{n'-10 \times P_{step}+1}^{SL}, \ldots, t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets $y+j \times P'_{rsvp\_TX}=z+P_{step} \times k \times q$ where $j=0, 1, \ldots, C_{resel}-1$, $P'_{rsvp\_TX}=P_{step} \times P_{rsvp\_TX}/100$, k is any value allowed by the higher layer parameter restrictResourceReservationPeriod and $q=1, 2, \ldots, Q$. Here, $$Q = \frac{1}{k}$$

if $k<1$ and $n'-z \leq P_{step} \times k$, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.
6) The UE shall exclude any candidate single-subframe resource $R_{x,y}$ from the set $S_A$ if it meets all the following conditions:
   the UE receives an SCI format 1 in subframe $t_m^{CL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX}, Prio_{RX}}$.
   the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and sub-frames which overlaps with $R_{x,y+j \times P'_{rsvp\_TX}}$ for $q=1, 2, \ldots, Q$ and $j=0, 1, \ldots, C_{resel}-1$. Here, $$Q = \frac{1}{P_{rsvp\_RX}}$$

if $P_{rsvp\_RX}<1$ and $n'-m \leq P_{step} \times P_{rsvp\_RX}$, where $t_n^{SL}=n$ if subframe n belongs to the set $(t_0^{SL}, t_1^{SL}, \ldots, t_{T_{max}}^{SL})$ otherwise subframe $t_n^{SL}$ is the first subframe after subframe n belonging to the set $(t_0^{SL}, t_1^{SL}, \ldots, t_{T_{max}}^{SL})$ otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}-1$ in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 M_{total}$, 10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

In 3GPP TS 36.213 V15.3.0, concepts and procedures of sidelink transmission in LTE are quoted below.

14.1 Physical Sidelink Shared Channel Related Procedures 14.1.1 UE Procedure for Transmitting the PSSCH If the UE transmits SCI format 1 on PSCCH according to a PSCCH resource configuration in subframe n, then for the corresponding PSSCH transmissions of one TB for sidelink transmission mode 3,
  the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4,
  the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

if higher layer indicates that rate matching for the last symbol in the subframe is used for the given PSSCH Transmission Format of corresponding SCI format 1 is set to 1,
  the modulation order is determined using the "modulation and coding scheme" field ($I_{MSC}$) in SCI format 1.
  for $0 \leq I_{MCS} \leq 28$, the TBS index ($I_{TBS}$) is determined based on $I_{MCS}$ and Table 8.6.1-1,
  for $29 \leq I_{MCS} \leq 31$, the TBS index ($I_{TBS}$) is determined based on $I_{MCS}$ and Table 14.1.1-2,
  the transport block size is determined by using $I_{TBS}$ and setting the Table 7.1.7.2.1-1 column indicator to max $\{\lfloor N'_{PRB} \times 0.8 \rfloor, 1\}$, where $N_{RB}$ to the total number of allocated PRBs based on the procedure defined in Subclause 14.1.1.4A and 14.1.1.4B.

otherwise
  Transmission Format of SCI format 1 is set to 0 if present,
  the modulation order is determined using the "modulation and coding scheme" field ($I_{MCS}$) in SCI format 1. For $0 \leq I_{MCS} \leq 28$, the modulation order is set to $Q'=\min(4, Q'_m)$, where $Q'_m$ is determined from Table 8.6.1-1.
  the TBS index ($I_{TBS}$) is determined based on $I_{MCS}$ and Table 8.6.1-1, and the transport block size is determined using $I_{TBS}$ and the number of allocated resource blocks ($N_{PRB}$) using the procedure in Subclause 7.1.7.2.1.

For sidelink transmission mode 3 and 4, the parameter $P_{step}$ is given by table 14.1.1-1.

TABLE 14.1.1-2

Modulation and TBS index table for $29 \leq I_{MCS} \leq 31$

| MCS Index $I_{MCS}$ | Modulation Order $Q'_m$ | TBS Index $I_{TBS}$ |
|---|---|---|
| 29 | 6 | 30 |
| 30 | 6 | 31 |
| 31 | 6 | 33 |

TABLE 14.1.1-1

Determination of $P_{step}$ for sidelink transmission mode 3 and 4

| | $P_{step}$ |
|---|---|
| TDD with UL/DL configuration 0 | 60 |
| TDD with UL/DL configuration 1 | 40 |
| TDD with UL/DL configuration 2 | 20 |
| TDD with UL/DL configuration 3 | 30 |
| TDD with UL/DL configuration 4 | 20 |
| TDD with UL/DL configuration 5 | 10 |
| TDD with UL/DL configuration 6 | 50 |
| Otherwise | 100 |

14.1.1.48 UE Procedure for Determining Subframes and Resource Blocks for Transmitting PSSCH and Reserving Resources for Sidelink Transmission Mode 4

If the UE has a configured sidelink grant (described in [8]) in subframe $t_n^{SL}$ with the corresponding PSCCH resource m (described in Subclause 14.2.4), the resource blocks and subframes of the corresponding PSSCH transmissions are determined according to 14.1.1.4C. The number of subframes in one set of the time and frequency resources for transmission opportunities of PSSCH is given by $C_{resel}$ where $C_{resel}=10*SL\_RESOURCE\_RESELECTION\_COUNTER$ [8] if configured else $C_{resel}$ is set to 1.

If a set of sub-channels in subframe $t_m^{SL}$ is determined as the time and frequency resource for PSSCH transmission corresponding to the configured sidelink grant (described in [8]), the same set of sub-channels in subframes $t_{m+j \times P'_{rsvp\_TX}}^{SL}$ are also determined for PSSCH transmissions corresponding to the same sidelink grant where j=1, $C_{resel}-1$, $P'_{rsvp\_TX}=P_{step} \times P_{rsvp\_TX}/100$, and $(t_0^{SL}, t_1^{SL}, t_2^{SL}, \ldots)$ is determined by Subclause 14.1.5. Here, $P_{rsvp\_TX}$ is the resource reservation interval indicated by higher layers.

If a UE is configured with high layer parameter cr-Limit and transmits PSSCH in subframe n, the UE shall ensure the following limits for any priority value k;

$$\sum_{i \geq k} CR(i) \leq CR_{Limit}(k)$$

where CR(i) is the CR evaluated in subframe n−4 for the PSSCH transmissions with "Priority" field in the SCI set to i, and $CR_{Limit}(k)$ corresponds to the high layer parameter cr-Limit that is associated with the priority value k and the CBR range which includes the CBR measured in subframe n−4. It is up to UE implementation how to meet the above limits, including dropping the transmissions in subframe n.

14.1.1.5 UE Procedure for PSSCH Power Control

For sidelink transmission mode 3, the UE transmit power $P_{PSSCH}$ for PSSCH transmission is given by $$P_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}[dBm],$$

where $P_{CMAX}$ is defined in [6], and $M_{PSSCH}$ is the bandwidth of the PSSCH resource assignment expressed in number of resource blocks and $PL=PL_c$ where $PL_c$ is defined in Subclause 5.1.1.1. $P_{O\_PSSCH,3}$ and $\alpha_{PSSCH,3}$ are provided by higher layer parameters p0SL-V2 V and alphaSL-V2V, respectively and that are associated with the corresponding PSSCH resource configuration. For sidelink transmission mode 4, the UE transmit power $P_{PSSCH}$ for PSSCH transmission in subframe n is given by $$P_{PSSCH} = 10\log_{10}\left(\frac{M_{PSSCH}}{M_{PSSCH} + 10^{\frac{3}{10}} \times M_{PSCCH}}\right) + A \ [dBm],$$

where $P_{CMAX}$ is defined in [6], $M_{PSSCH}$ is the bandwidth of the PSSCH resource assignment expressed in number of resource blocks, $M_{PSCCH}=2$, and $PL=PL_c$ where $PL_c$ is defined in Subclause 5.1.1.1. $P_{O\_PSSCH,4}$ and $\alpha_{PSSCH,4}$ are provided by higher layer parameters p0SL-V2 V and alphaSL-V2 V, respectively and that are associated with the corresponding PSSCH resource configuration. If higher layer parameter maxTxpower is configured then $$A = \min\{P_{CMAX}, P_{MAX\_CBR},$$

$$10\log_{10}\left(M_{PSSCH} + 10^{\frac{3}{10}} \times M_{PSCCH}\right) + P_{O\_PSSCH,4} + \alpha_{PSSCH,4} \cdot PL\}$$

else $$A = \min\{P_{CMAX},$$

$$10\log_{10}\left(M_{PSSCH} + 10^{\frac{3}{10}} \times M_{PSCCH}\right) + P_{O\_PSSCH,4} + \alpha_{PSSCH,4} \cdot PL\}$$

where $P_{MAX\_CBR}$ is set to a maxTxpower value based on the priority level of the PSSCH and the CBR range which includes the CBR measured in subframe n−4.

14.1.1.7 Conditions for Selecting Resources when the Number of HARQ Transmissions is Two in Sidelink Transmission Mode 4

When a set of subframes $t_{n+j \times P'_{rsvp\_TX}}^{SL}$, for j=0, 1, ..., J−1 have been selected for a set of transmission opportunities of PSSCH, a set of subframes $t_{n+k+j \times P'_{rsvp\_TX}}^{SL}$ for j=0, 1, ..., J−1 for another set of transmission opportunities of PSSCH shall meet the conditions −15≤k≤15 and k≠0 where $P'_{rsvp\_TX}=P_{step} \times P_{rsvp\_TX}/100$ and J is the maximum number of transmission opportunities of PSSCH in a selected subframe set. Here, $P_{rsvp\_TX}$ is the resource reservation interval provided by higher layers.

14.1.5 UE Procedure for Determining Resource Block Pool and Subframe Pool for Sidelink Transmission Mode 3 and 4

The set of subframes that may belong to a PSSCH resource pool for sidelink transmission mode 3 or 4 is denoted by $(t_0^{SL}, t_1^{SL}, \ldots, t_{T_{max}}^{SL})$ where $0 \leq t_i^{SL} < 10240$, the subframe index is relative to subframe #0 of the radio frame corresponding to SFN 0 of the serving cell or DFN 0 (described in [11]), the set includes all the subframes except the following subframes, subframes in which SLSS resource is configured, downlink subframes and special subframes if the sidelink transmission occurs in a TDD cell, reserved subframes which are determined by the following steps:

1) the remaining subframes excluding $N_{slss}$ and $N_{dssf}$ subframes from the set of all the subframes are denoted by $(l_0, l_1, \ldots l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) a subframe $l_r$ $(0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor$$

where m=0, ..., $N_{reserved}-1$ and $N_{reserved}=(10240-N_{slss}-N_{dssf})\bmod L_{bitmap}$. Here, $L_{bitmap}$ the length of the bitmap is configured by higher layers.

the subframes are arranged in increasing order of subframe index.

The UE determines the set of subframes assigned to a PSSCH resource pool as follows:

A bitmap $(b_0, b_1, ..., b_{bitmap})$ associated with the resource pool is used where $L_{bitmap}$ the length of the bitmap is configured by higher layers.

A subframe $t_k^{SL}(0 \leq k < (10240-N_{slss}-N_{dssf}-N_{reserved}))$ belongs to the subframe pool if $b_{k'}=1$ where $k'=k \bmod L_{bitmap}$.

14.2 Physical Sidelink Control Channel Related Procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

TABLE 14.2-1

| PDCCH/EPDCCH configured by SL-RNTI | |
| --- | --- |
| DCI format | Search Space |
| DCI format 5 | For PDCCH: Common and UE specific by C-RNTI<br>For EPDCCH: UE specific by C-RNTI |

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

| PDCCH/EPDCCH configured by SL-V-RNTI or SL-SPS-V-RNTI | |
| --- | --- |
| DCI format | Search Space |
| DCI format 5A | For PDCCH: Common and UE specific by C-RNTI<br>For EPDCCH: UE specific by C-RNTI |

The carrier indicator field value in DCI format 5A corresponds to v2x-InterFreqInfo.

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, ...)$ and that starts not earlier than $$T_{DL} - \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, ...)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, ...)$ and that starts not earlier than $$T_{DL} - \frac{N_{TA}}{2} \times T_S + (4+m) \times 10^{-3}.$$

$L_{Init}$ is the value indicated by "Lowest index of the subchannel allocation to the initial transmission" associated with the configured sidelink grant (described in [8]), $(t_0^{SL}, t_1^{SL}, t_2^{SL}, ...)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_s$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$ If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$, where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

TABLE 14.2.1-1

Mapping of DCI format 5A offset field to indicated value m

| SL index field in DCI format 5A | Indicated value m |
|---|---|
| '00' | 0 |
| '01' | 1 |
| '10' | 2 |
| '11' | 3 |

TABLE 14.2.1-2

Determination of the Resource reservation field in SCI format 1

| Resource reservation field in SCI format 1 | Indicated value X | Condition |
|---|---|---|
| '0001', '0010', . . . , '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

14.2.1.3 UE Procedure for PSCCH Power Control

For sidelink transmission mode 3, the UE transmit power $P_{PSCCH}$ for PSCCH transmission is given by $$P_{PSSCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSSCH3} + \alpha_{PSSCH,3} \cdot PL\right\}[\text{dBm}],$$

where $P_{CMAX}$ is defined in [6], $M_{PSSCH}$ is the bandwidth of the PSSCH resource assignment expressed in number of resource block, $M_{PSCCH}$=2, and PL=$PL_c$ where $PL_c$ is defined in Subclause 5.1.1.1. $P_{O\_PSSCH,3}$ and $\alpha_{PSSCH,3}$ are provided by higher layer parameters p0SL-V2 V and alphaSL-V2 V, respectively and that are associated with the corresponding PSSCH resource configuration.

For sidelink transmission mode 4, the UE transmit power $P_{PSCCH}$ for PSCCH transmission in subframe n is given by $$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) + B \text{ [dBm]},$$

where $P_{CMAX}$ is defined in [6], $M_{PSSCH}$ is the bandwidth of the PSSCH resource assignment expressed in number of resource block, $M_{PSCCH}=2$, and $PL=PL_c$ where $PL_c$ is defined in Subclause 5.1.1.1. $P_{O\_PSSCH,4}$ and $\alpha_{PSSCH,4}$ are provided by higher layer parameters p0SL-V2 V and alphaSL-V2 V, respectively and that are associated with the corresponding PSSCH resource configuration. If higher layer parameter maxTxpower is configured then $$B = \min\{P_{CMAX}, P_{MAX\_CBR},$$
$$10\log_{10}\left(M_{PSSCH} + 10^{\frac{3}{10}} \times M_{PSCCH}\right) + P_{O\_PSSCH,4} + \alpha_{PSSCH,4} \cdot PL\}$$

else $$B = \min\{P_{CMAX},$$
$$10\log_{10}\left(M_{PSSCH} + 10^{\frac{3}{10}} \times M_{PSCCH}\right) + P_{O\_PSSCH,4} + \alpha_{PSSCH,4} \cdot PL\}$$

where $P_{MAX\_CBR}$ is set to a maxTxpower value based on the priority level of the PSSCH and the CBR range which includes the CBR measured in subframe n−4.

14.2.2 UE Procedure for Receiving the PSCCH

For each PSCCH resource configuration associated with sidelink transmission mode 1, a UE configured by higher layers to detect SCI format 0 on PSCCH shall attempt to decode the PSCCH according to the PSCCH resource configuration, and using the Group destination IDs indicated by higher layers.

For each PSCCH resource configuration associated with sidelink transmission mode 2, a UE configured by higher layers to detect SCI format 0 on PSCCH shall attempt to decode the PSCCH according to the PSCCH resource configuration, and using the Group destination IDs indicated by higher layers.

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

14.2.4 UE Procedure for Determining Resource Block Pool for PSCCH in Sidelink Transmission Mode 3 and 4

The following procedure is used for sidelink transmission mode 3 and 4.

If a pool is (pre)configured such that a UE always transmits PSCCH and the corresponding PSSCH in adjacent resource blocks in a subframe, the PSCCH resource m is the set of two contiguous resource blocks with the physical resource block number $n_{PRB}=n_{subCHRBstart}+m*n_{subCHsize}+j$ for j=0 and 1 where $n_{subCHRBstart}$ and $n_{subCHsize}$ are given by higher layer parameters startRBSubchannel and sizeSubchannel, respectively.

If a pool is (pre)configured such that a UE may transmit PSCCH and the corresponding PSSCH in non-adjacent resource blocks in a subframe, the PSCCH resource m is the set of two contiguous resource blocks with the physical resource block number $n_{PRB}$ $n_{PSCCHstart}+2*m+j$ for j=0 and 1 where $n_{PSCCHstart}$ is given by higher layer parameter startRBPSCCHPool.

In Final Report of 3GPP TSG RAN WG1#94 v1.0.0, agreements for NR V2X sidelink transmission in RAN1#94 meeting are quoted below.

Figure 6:
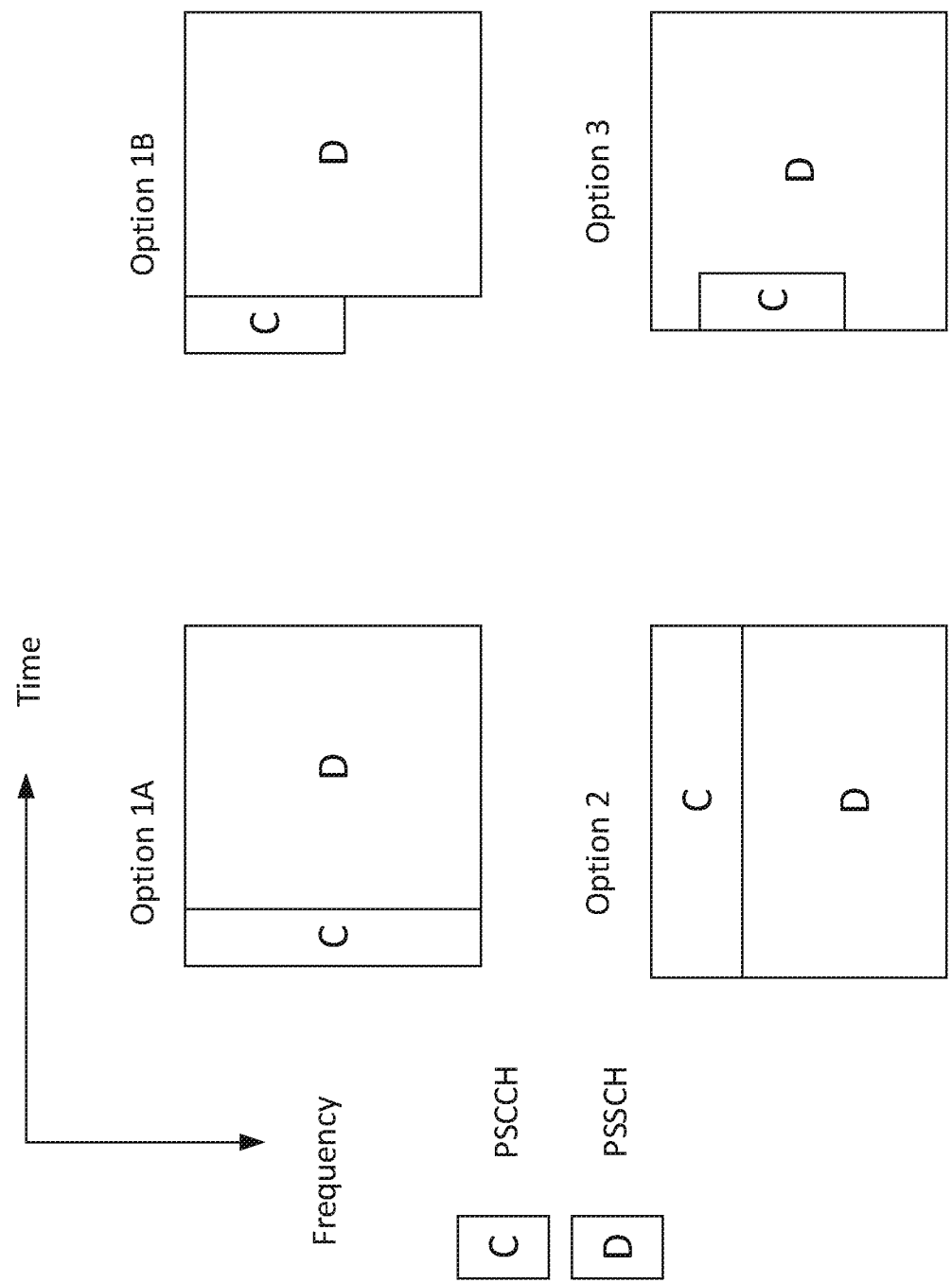
FIG. 6 illustrates configurations related to resources associated with Physical Sidelink Shared Channel (PSSCH) and Physical Sidelink Control Channel (PSCCH).

Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
    Study further the following options:
      Option 1: PSCCH and the associated PSSCH are transmitted using non-overlapping time resources.
        Option 1A: The frequency resources used by the two channels are the same.
        Option 1B: The frequency resources used by the two channels can be different.
      Option 2: PSCCH and the associated PSSCH are transmitted using non-overlapping frequency resources in the all the time resources used for transmission. The time resources used by the two channels are the same.
      Option 3: A part of PSCCH and the associated PSSCH are transmitted using overlapping time resources in non-overlapping frequency resources, but another part of the associated PSSCH and/or another part of the PSCCH are transmitted using non-overlapping time resources.
Illustration of the above options:
[Notably, illustration of Final Report of 3GPP TSG RAN WG1#94 v1.0.0 is reproduced herein as FIG. 6.]
Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources
Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)

c) UE is configured with NR configured grant (type-1 like) for sidelink transmission d) UE schedules sidelink transmissions of other UEs RAN1 to continue study details of resource allocation modes for NR-V2X sidelink communication In Final Report of 3GPP TSG RAN WG1#94bis v1.0.0, agreements for NR V2X sidelink transmission in RAN1#94b meeting are quoted below.

Agreements:
 For unicast, sidelink HARQ feedback and HARQ combining in the physical layer are supported.
  FFS details, including the possibility of disabling HARQ in some scenarios
 For groupcast, sidelink HARQ feedback and HARQ combining in the physical layer are supported.
  FFS details, including the possibility of disabling HARQ in some scenarios Agreements:
 In the context of sidelink CSI, RAN1 to study further which of the following information is useful in sidelink operation when it is available at the transmitter.
  Information representing the channel between the transmitter and receiver
  Information representing the interference at receiver
  Examples for this information are
   CQI, PMI, RI, RSRP, RSRQ, pathgain/pathloss, SRI, CRI, interference condition, vehicle motion
  FFS including
   Such information can be acquired using reciprocity or feedback
   Time scale of the information
   Which information is useful in which operation and scenario Agreements:
For PSCCH and associated PSSCH multiplexing
 At least one of Option 1A, 1B, and 3 is supported.
  FFS whether some options require transient period between PSCCH and PSSCH.
 FFS whether to support Option 2

Agreements:
 Sidelink control information (SCI) is defined.
  SCI is transmitted in PSCCH.
  SCI includes at least one SCI format which includes the information necessary to decode the corresponding PSSCH.
  NDI, if defined, is a part of SCI.
 Sidelink feedback control information (SFCI) is defined.
  SFCI includes at least one SFCI format which includes HARQ-ACK for the corresponding PSSCH.
   FFS whether a solution will use only one of "ACK," "NACK," "DTX," or use a combination of them.
  FFS how to include other feedback information (if supported) in SFCI.
  FFS how to convey SFCI on sidelink in PSCCH, and/or PSSCH, and/or a new physical sidelink channel
  FFS in the context of Mode 1:
   whether/how to convey information for SCI on downlink
   whether/how to convey information of SFCI on uplink Agreements:
 At least resource pool is supported for NR sidelink
  Resource pool is a set of time and frequency resources that can be used for sidelink transmission and/or reception.
   FFS whether a resource pool consists of contiguous resources in time and/or frequency.
   A resource pool is inside the RF bandwidth of the UE.
   FFS how gNB and other UEs know the RF bandwidth of the UE
   FFS if BWP (if defined) can be used to in defining at least part of resource pool
   FFS if the numerology of a resource pool is indicated as a part of (pre-)configuration for resource pool, carrier, band, or BWP (if defined)
   UE assumes a single numerology in using a resource pool.
  Multiple resource pools can be configured to a single UE in a given carrier.
   FFS how to use multiple resource pools when (pre-) configured.

Agreements:
 Sidelink sensing and resource selection procedures are studied for Mode-2(a)
  The following techniques are studied to identify occupied sidelink resources
   decoding of sidelink control channel transmissions
   sidelink measurements
   detection of sidelink transmissions
   other options are not precluded, including combination of the above options
  The following aspects are studied for sidelink resource selection
   how a UE selects resource for PSCCH and PSSCH transmission (or other sidelink physical channel/signal, if it is introduced)
   which information is used by UE for resource selection procedure In Draft Report of 3GPP TSG RAN WG1#95 v0.2.0.

Agreements:
 BWP is defined for NR sidelink.
  In a licensed carrier, SL BWP is defined separately from BWP for Uu from the specification perspective.
  FFS the relation with Uu BWP.
  The same SL BWP is used for both Tx and Rx.
  Each resource pool is (pre)configured within a SL BWP.
  Only one SL BWP is (pre)configured for RRC idle or out of coverage NR V2X UEs in a carrier.
  For RRC connected UEs, only one SL BWP is active in a carrier. No signalling is exchanged in sidelink for activation and deactivation of SL BWP.
   Working assumption: only one SL BWP is configured in a carrier for a NR V2X UE
   Revisit in the next meeting if significant issues are found
  Numerology is a part of SL BWP configuration.
Note: This does not intend to make restriction in designing the sidelink aspects related to SL BWP.
Note: This does not preclude the possibility where a NR V2X UE uses a Tx RF bandwidth the same as or different than the SL BWP.

Working assumption:
 Regarding PSCCH/PSSCH multiplexing, at least option 3 is supported for CP-OFDM.
  RAN1 assumes that transient period is not needed between symbols containing PSCCH and symbols not containing PSCCH in the supported design of option 3.
  FFS how to determine the starting symbol of PSCCH and the associated PSSCH
  FFS for other options. e.g. whether some of them are supported to increase PSCCH coverage.

Agreement:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
FFS whether to support SL HARQ feedback per CBG Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise. Details are FFS including the following:
Whether to introduce an additional criterion in deciding HARQ-NACK transmission
Whether/how to handle DTX issue (i.e., transmitter UE cannot recognize the case that a receiver UE misses PSCCH scheduling PSSCH)
Issues when multiple receiver UEs transmit HARQ-NACK on the same resource
How to determine the presence of HARQ-NACK transmissions from receiver UEs
Whether/how to handle destructive channel sum effect of HARQ-NACK transmissions from multiple receiver UEs if the same signal is used
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:
Whether to introduce an additional criterion in deciding HARQ-ACK/NACK transmission
How to determine the PSFCH resource used by each receiver UE
FFS whether to support SL HARQ feedback per CBG
Other options are not precluded Agreements:
It is supported to enable and disable SL HARQ feedback in unicast and groupcast.
FFS when HARQ feedback is enabled and disabled.

Agreements:
Sensing procedure is defined as SCI decoding from other UEs and/or sidelink measurements
FFS information extracted from SCI decoding
FFS sidelink measurements used
FFS UE behavior and timescale of sensing procedure
Note: It is up to further discussion whether SFCI is to be used in sensing procedure
Note: Sensing procedure can be discussed in the context of other modes
Resource (re)-selection procedure uses results of sensing procedure to determine resource(s) for sidelink transmission
FFS timescale and conditions for resource selection or re-selection
FFS resource selection/re-selection details for PSCCH and PSSCH transmissions
FFS details for PSFCH (e.g. whether resource (re)-selection procedure based on sensing is used or there is a dependency/association b/w PSCCH/PSSCH and PSFCH resource)
FFS impact of sidelink QoS attributes on resource selection/re-selection procedure
For Mode-2(a), the following schemes for resource selection are evaluated, including
Semi-persistent scheme: resource(s) are selected for multiple transmissions of different TBs
Dynamic scheme: resource(s) are selected for each TB transmission In Final Report of 3GPP TSG RAN WG1#88 v1.0.0, in LTE, CBR and/or CR could be a metric for sidelink channel and/or system congestion control. Based on the similar logic, we assume CBR and/or CR could be inherited with some modification in NR V2X. One possible modification may change "subframe" to "slot" and/or "mini-slot" and/or "a time unit of a side link resource pool".

Agreements:
CBR is measured and CR is evaluated for each (re) transmission
For a (re)transmission in subframe n+4, the CR is evaluated in subframe n.
For a (re)transmission in subframe n+4, the CBR measured in subframe n is used.
CBR and CR are defined as follows (note that this supersedes the existing agreement on the CR definition):

| Definition | Channel busy ratio (CBR) measured at subframe n is defined as follows: For PSSCH, the portion of sub-channels in the resource pool whose S-RSSI measured by the UE exceed a (pre-)configured threshold sensed over subframes [n − 100, n − 1];<br>For PSCCH in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two resource blocks. |
|---|---|

NOTE:
The subframe index is based on physical subframe index.

| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n+b]. |
|---|---|

NOTE 1:
a is a positive integer and b is 0 or a positive integer; a and b are determined by UE implementation with a + b + 1 = 1000, a >= 500, and n + b should not exceed the last transmission opportunity of the grant for the current transmission.
NOTE 2:
CR is evaluated for each (re)transmission.
NOTE 3:
In evaluating CR, the UE shall assume the transmission parameter used at subframe n is reused according to the existing grant(s) in subframes [n + 1, n + b] without packet dropping.
NOTE 4:
The subframe index is based on physical subframe index.

In Final Report of 3GPP TSG RAN WG1#91 v1.0.0, UE's limited capability concept are quoted below.

Agreement

From RAN1 understanding, the limited TX capability means that the UE cannot support transmission(s) over carrier(s) in a subframe due to
  (a) Number of TX chains smaller than the number of configured TX carriers or
  (b) UE doesn't support the given band combination or
  (c) TX chain switching time or
  (d) UE cannot fulfill the RF requirement due to, e.g., PSD imbalance For a UE with limited TX capability, RAN1 considers the following options for resource selection in mode 4 CA.
  Option 1-1: When the UE performs the resource selection for a certain carrier, any subframe of that carrier shall be excluded from the reported candidate resource set if using that subframe exceeds its TX capability limitation under the given resource reservation in the other carriers.
    FFS details, e.g., the carrier resource selection order should consider PPPP of transmission and CBR.
  Option 1-2: If the per-carrier independent resource selection leads to transmissions beyond the TX capability of the UE in a subframe, UE re-does resource reselection within the given reported candidate resource set until the resultant transmission resources can be supported by the UE.
    FFS: whether it is up to UE implementation
    FFS details, e.g., the carrier resource selection order should consider PPPP of transmission and CBR.
  Option 2: After performing the per-carrier independent resource selection, the UE shall drop transmission in a subframe where using that subframe exceed its TX capability limitation.
    FFS details of dropping rule, e.g., whether/how to consider PPPP and CBR
  FFS whether/how to consider other aspects (e.g., half duplex problem) in terms of resource selection Down-select one combination among the followings:
  Option 1-1 for (a), (b), and (c)
    the UE shall drop transmission in a subframe where using that subframe is beyond TX capability with (d)
  Option 1-1 for (a), (b), and (c)
    UE re-does resource reselection within the given reported candidate resource set until the resultant transmission resources fulfill TX capability with (d)
  Option 1-2 for (a), (b), and (c)+Option 2 for (d)
  Option 1-1 for (a), (b), (c), and (d)
  Option 1-2 for (a), (b), (c), and (d)
  Option 2 for (a), (b), (c), and (d)

In R1-1812364, one company's proposal is quoted below.
SFCI and Its Carrier
In the RAN1#94bis meeting, sidelink feedback control information (SFCI) is defined. Also, at least ACK/NACK is included in one of the SFCI formats. Here we discuss how to convey SFCI on sidelink and restrict attention to ACK/NACK.
First, we expect that NR LDPC is used for PSSCH. Then, PSSCH is not suitable to carry ACK/NACK alone since NR LDPC is designed for moderate to large input block lengths. Next, we consider the case where ACK/NACK is transmitted on PSCCH. In the following we assume that the multiplexing of PSCCH and PSSCH follows a TDM-like design such as Options 1 or 3. Assume that UE 1 transmits a packet to UE 2 in slot n. After decoding PSSCH, UE 2 sends ACK/NACK to UE 1. A potential issue of carrying ACK/NACK by PSCCH is latency. Considering UE processing time on PSSCH, it is challenging that UE 2 can send ACK/NACK in the beginning of slot n+1. If ACK/NACK is transmitted in slot n+2, then a retransmission from UE 2 can only be scheduled in slot n+3. The reason is explained below.

Due to half duplex, when UE 2 transmits ACK/NACK on PSCCH, UE 2 cannot decode PSCCH sent from other UEs. Even if UE 2 switches back to receive mode after sending ACK/NACK, UE 2 cannot decode PSSCH since it does not know the scheduling assignment. Thus, it is better for UE 2 to stay in transmit mode. UE 2 can transmit CSI on PSSCH to UE1 for facilitating link adaptation.

Similarly, from UE 1's perspective, after UE 1 receives ACK/NACK, switching to transmit mode is useless because no SCI can be sent when receiving ACK/NACK. Thus, if ACK/NACK is transmitted on PSCCH, then each UE should not change the transmit/receive mode within the slot.

Observation 2: If initial transmission is in slot n and ACK/NACK is transmitted on PSCCH, a retransmission can only be scheduled at the earliest in slot n+3.

Observation 3: Due to half duplex, if ACK/NACK is transmitted on PSCCH, the UE sending ACK/NACK cannot decode any PSSCH in that slot.

Now we consider the case where a separate channel is defined for carrying SFCI, which is termed "PSFCH" for convenience. Similar to the discussion in Section 3, a FDM-like channel is undesirable due to high latency. Then, to minimize the number of TX/RX switching within a slot, it is natural that this separate channel is placed in the end of slot.

Proposal 7: If a new physical sidelink channel is introduced for SFCI, then it should be placed in the end of slot following a TDM-like design.

In the beginning of a slot, a UE can be in receive mode and later on switch to transmit mode for transmitting ACK/NACK; or vice versa. In this case, an extra guard period has to be added for UEs switching from receive mode to transmit mode for ACK/NACK transmission and for UEs switching from transmit mode to receive mode for ACK/NACK reception. As for UEs not transmitting or receiving ACK/NACK, such guard period is not required. Nevertheless, when some UEs perform TX/RX switching within a slot, the experienced power level changes and it takes time for AGC settling. We propose to further study two alternatives regarding the additional guard period.

Proposal 8: If a dedicated physical channel is introduced for SFCI, the following two options for guard period are FFS:
  Option 1: Every slot has two guard periods, one in the beginning and one just before the channel carrying SFCI;
  Option 2: A guard period is introduced only when performing TX/RX switching.

Similar to multiplexing of PSCCH and PSSCH, if a new physical sidelink channel is introduced for SFCI, then the multiplexing of the new channel and PSSCH should be further studied.

Proposal 9: If a dedicated physical channel is introduced for SFCI, the following two options for multiplexing with PSSCH are FFS:
  Option A: Exclusive time resource for the channel carrying SFCI;
  Option B: Within the time resource used by the channel carrying SFCI, PSSCH of the same UE or other UEs can occupy unused frequency resources.

The combined options for additional guard period and for multiplexing of PSFCH and PSSCH are illustrated in FIG. 4.

Figure 7:
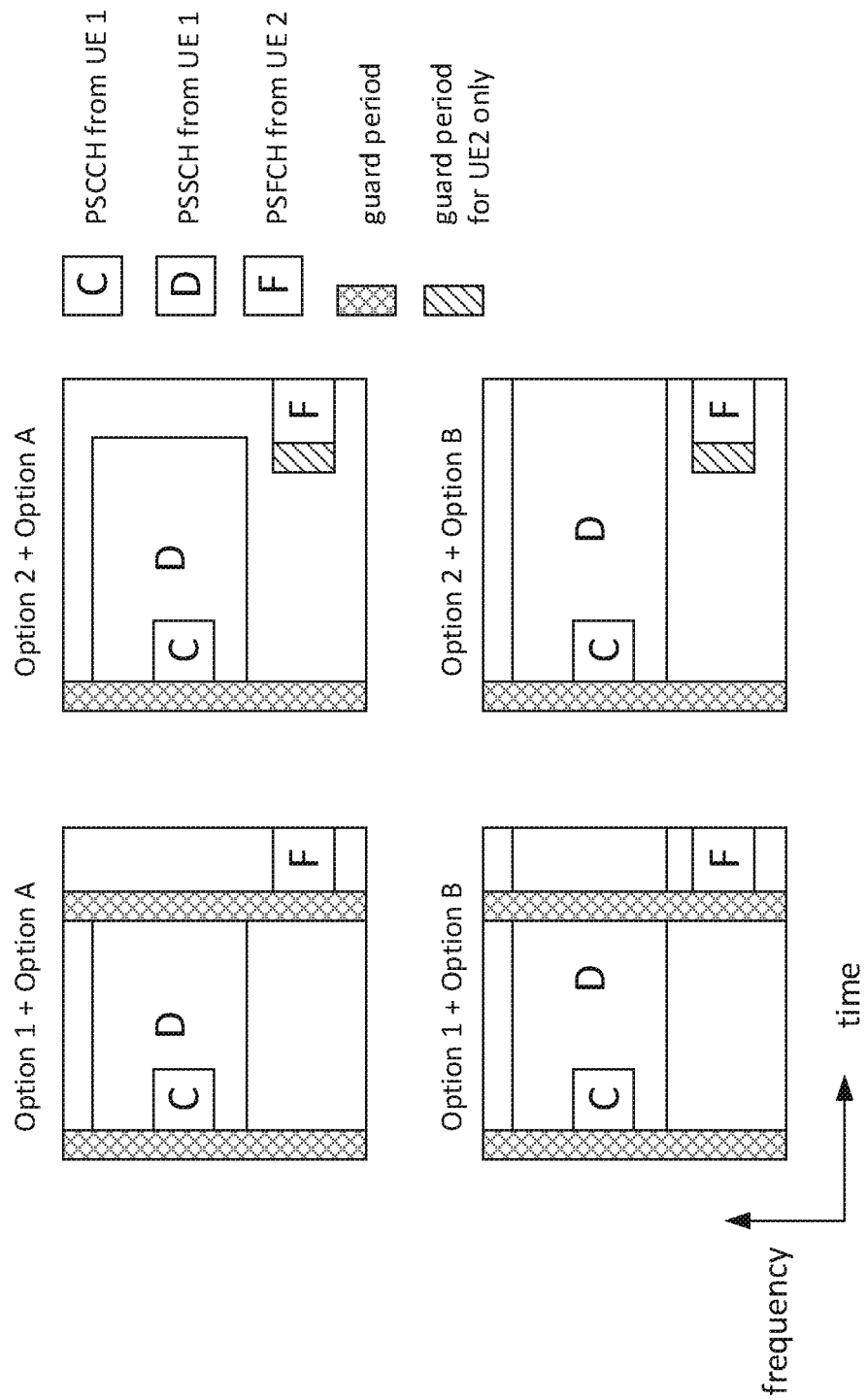
FIG. 7 illustrates configurations related to resources associated with Physical Sidelink Feedback Channel (PSFCH), PSSCH and PSCCH.

[Notably, FIG. 4 of R1-1812364, entitled "Additional guard period and multiplexing of PSFCH and PSSCH" is reproduced herein as FIG. 7.]

In R1-1814265, feature's lead summary for HARQ-ACK feedback of unicast sidelink transmission is quoted below.

For time resource,
Option 1-1: Time gap between PSSCH and the associated PSFCH is (pre)configured or fixed
Option 1-2: Time gap between PSSCH and the associated PSFCH is signalled via SCI For frequency resource,
Option 2-1: Frequency resource of PSFCH is determined by the resource used for the associated PSSCH
Option 2-2: Frequency resource of PSFCH is signalled via SCI
Option 2-3: Frequency resource of PSFCH is selected by receiver of the associated PSSCH Some or all of the following terminology and assumptions may be used hereafter.

Base station (BS): a network central unit and/or a network node in New Radio Access Technology (NR) which is used to control one or more transmission and reception points (TRPs) which are associated with one or more cells. Communication between BS and TRP(s) may be via fronthaul. BS may be referred to as central unit (CU), evolved NodeB (eNB), next generation NodeB (gNB) and/or NodeB.

TRP: a TRP provides network coverage and directly communicates with UEs. TRP may be referred to as distributed unit (DU) and/or network node.

Cell: a cell may comprise one or more associated TRPs. For example, coverage of the cell is composed of coverage of the one or more associated TRPs. One cell may be controlled by one BS. Cell may be referred to as TRP group (TRPG).

For network side:
Downlink timing of TRPs in the same cell may be synchronized.
Radio Resource Control (RRC) layer of network side may be in a BS.

For UE side:
There are at least two UE (RRC) states: connected state (also called active state) and non-connected state (also called inactive state and/or idle state). Inactive state may be an additional state and/or may belong to connected state and/or non-connected state.

In some examples, a UE could be one or more of a device, a vehicle, etc.

Sidelink could be a communication link between devices. A sidelink could be a device-to-device (D2D) link. A sidelink could be associated with a source identity and/or a destination identity. The source identity could be used to identify a device that is a transmitter of the sidelink (e.g., the source identity may be indicative of a device that transmits the sidelink). The destination identity could be used by a receiver to identify whether a message associated with the sidelink is for the receiver (e.g., the destination identity may be indicative of a device configured to receive the message).

In LTE Vehicle-to-Everything (V2X) sidelink transmission and/or enhanced Vehicle-to-Everything (eV2X) sidelink transmission, sidelink transmission may be broadcast for public safety purposes. However, more and more services and use cases are identified to be supported in NR V2X. Broadcast sidelink transmission may not guarantee a stronger (and/or more strict) reliability requirement. In RAN1#94 meeting, it has been agreed that NR V2X supports unicast and groupcast sidelink transmission. In RAN1#95 meeting, a dedicated channel (e.g., Physical Sidelink Feedback Channel (PSFCH)) is designed and/or configured to transmit and/or carry Hybrid Automatic Repeat Request-Acknowledgement (HARQ-ACK) of unicast Physical Sidelink Shared Channel (PSSCH). Two mechanisms for determining a resource for PSFCH are discussed and summarized in R1-1814265. One mechanism is associated with a sidelink transmitter (sidelink TX) UE indicating a time-frequency resource for PSFCH. Alternatively and/or additionally, the time-frequency resource for PSFCH is associated with a resource for PSCCH/PSSCH transmitted by the sidelink TX UE. Another mechanism is associated with a sidelink receiver (sidelink RX) UE performing sensing and/or resource selection for PSFCH. However, in a scenario where the sidelink RX UE has occupied and/or reserved a resource for PSSCH based on a previous indication, wherein the resource for PSSCH at least partly and/or fully overlaps in the time domain with a resource for PSFCH, one or more operations for the sidelink RX UE to perform are undefined in the scenario where the sidelink RX UE is not allowed and/or able to transmit these two channels concurrently and/or simultaneously.

The scenario may occur when a transmitted power (e.g., transmission power) of a sidelink RX UE could not support simultaneous transmission of two channels and/or when the sidelink RX UE exceeds a capability (e.g., a capability associated with the sidelink RX UE is exceeded) due to inclusion of PSFCH. In one embodiment, a capability of a UE being exceeded may correspond to one or more of the following (referenced from Final Report of 3GPP TSG RAN WG1#91 v1.0.0): a number of TX chains (e.g., a number of transmit chains, such as a number of TX radio frequency (RF) chains) of the UE is lower than a number of configured TX carriers, the UE does not support a given band combination, a TX chain switching time and/or the UE cannot fulfill an RF requirement (e.g., UE cannot fulfill the RF requirement due to Power Spectrum Density (PSD) imbalance). In one embodiment, a capability of a UE being exceeded may correspond to a number of carriers on which the UE derives to transmit concurrently is larger than or exceed a number of carriers on which the UE is able to transmit concurrently.

Figure 8:
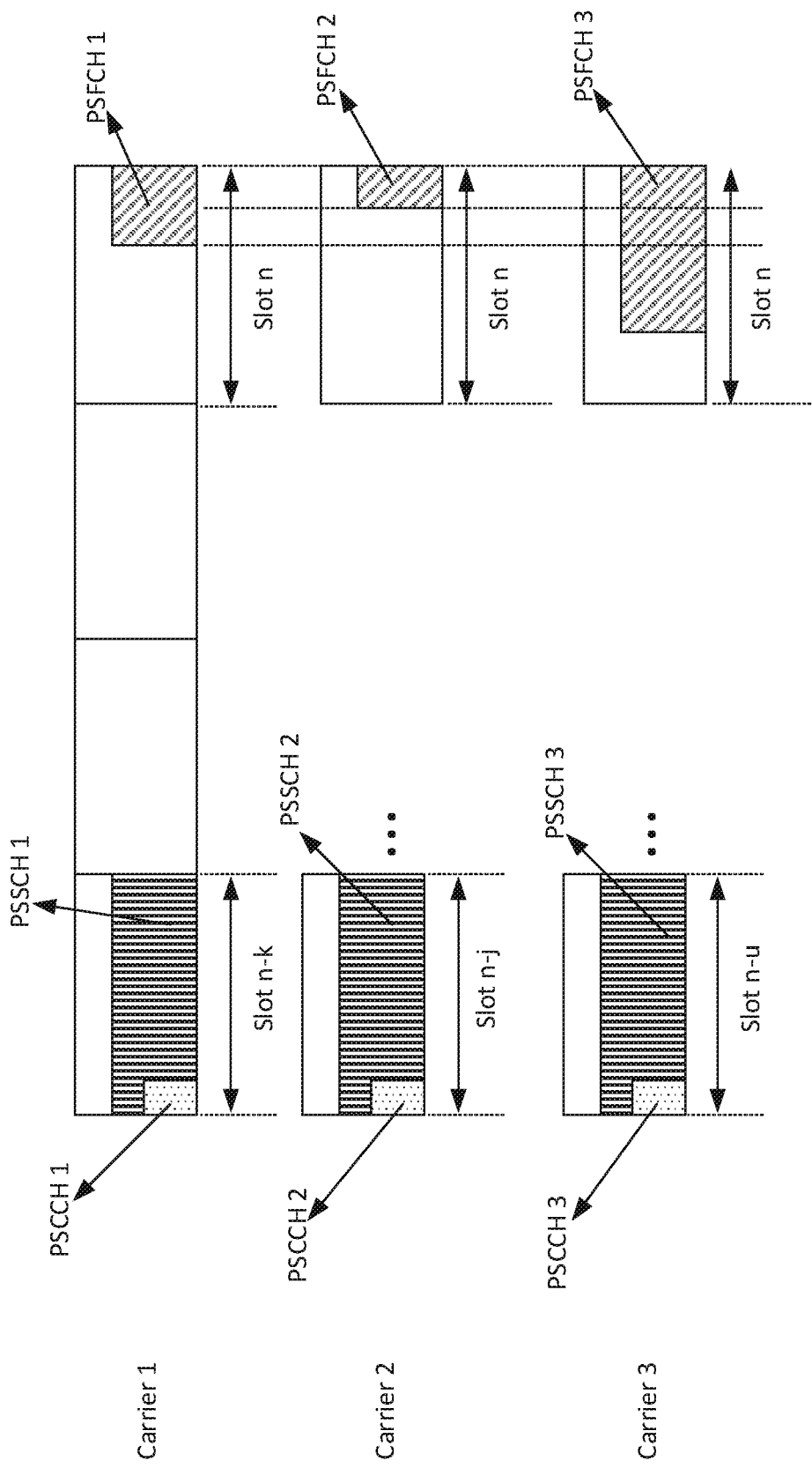
FIG. 8 illustrates an exemplary scenario associated with a configuration of carriers and/or slots associated with sidelink transmission.

FIG. 8 illustrates an exemplary scenario associated with a configuration of carriers and/or slots associated with sidelink transmission. In some examples, a slot may correspond to a resource configured in a sidelink resource pool of a carrier. A UE may be configured with a plurality of carriers, such as a first carrier "Carrier 1", a second carrier "Carrier 2" and/or a third carrier "Carrier 3". A number of TX RF chains associated with the UE may be 2. The UE may be required, indicated and/or instructed to transmit, in slot n, PSFCH 1 on the first carrier "Carrier 1", PSFCH 2 on the second carrier "Carrier 2" and PSFCH 3 on the third carrier "Carrier 3". For example, PSCCH 1 may be received and/or decoded in slot n-k on the first carrier "Carrier 1". PSCCH 1 may correspond to a Physical Sidelink Control Channel (PSCCH). The UE may receive, within the slot n-k and/or a different slot, PSSCH 1 scheduled by the PSCCH 1. The PSFCH 1 may be configured to carry a signal (e.g., a HARQ-ACK and/or a different signal) associated with the PSCCH 1 and/or the PSSCH 1. For example, transmission of the PSFCH 1 in the slot n may be determined and/or derived based upon the PSCCH 1 and/or the PSSCH 1. Alternatively and/or additionally, PSCCH 2 may be received and/or decoded in slot n-j on the second carrier "Carrier 2". The UE may receive, within the slot n-j and/or a different slot, PSSCH 2 scheduled by the PSCCH 2. The PSFCH 2 may be configured to carry a signal (e.g., a HARQ-ACK and/or a different signal) associated with the PSCCH 2 and/or the PSSCH 2. For example, transmission of the PSFCH 2 in the slot n may be determined and/or derived based upon the PSCCH 2 and/or the PSSCH 2. Alternatively and/or additionally, PSCCH 3 may be received and/or decoded in slot n-u on the third carrier "Carrier 3". The UE may receive, within the slot n-u and/or a different slot, PSSCH 3 scheduled by the PSCCH 3. The PSFCH 3 may be configured to carry a signal (e.g., a HARQ-ACK and/or a different signal) associated with the PSCCH 3 and/or the PSSCH 3. For example, transmission of the PSFCH 3 in the slot n may be determined and/or derived based upon the PSCCH 3 and/or the PSSCH 3.

In some examples, the PSFCH 1, the PSFCH 2 and/or the PSFCH 3 in slot n may be partly and/or fully overlapped with each other in the time domain. In one embodiment, the slot n-k, the slot n-j and/or the slot n-u could be the same slot and/or different slots. In the exemplary scenario, due to the number of TX RF chains being limited (e.g., limited to 2), the UE could not transmit the PSFCH 1, the PSFCH 2 and the PSFCH 3 concurrently and/or simultaneously in slot n. In some examples, the UE may select a PSFCH from amongst the PSFCH 1, the PSFCH 2 and the PSFCH 3 to drop. However, dropping a PSFCH from amongst the PSFCH 1, the PSFCH 2 and the PSFCH 3 may force (and/or cause) an unnecessary retransmission if the (dropped) PSFCH carries ACK (e.g., acknowledgement).

One or more concepts of sidelink resource pool associated with LTE V2X and/or eV2X may be used in NR V2X with one or more modifications. In LTE, a sidelink resource pool could be configured based on a "subframe". However, in NR, a sidelink resource pool could be configured based on a "slot" and/or based on a "mini-slot" (where a mini-slot may have a finer granularity than a slot).

In one embodiment, a first channel being partly and/or fully overlapped with a second channel in the time domain may mean/imply/correspond to both the first channel and the second channel being transmitted (and/or the first channel and the second channel being derived to be transmitted) in a (single) slot (and/or both the first channel and the second channel being scheduled for transmission in a single slot).

In one embodiment, the first channel could be transmitted on a carrier different than a carrier that the second channel is transmitted on. For example, the first channel could be transmitted on a first exemplary carrier and the second channel could be transmitted on a second exemplary carrier, different than the first exemplary carrier. Alternatively and/or additionally, the first channel could be transmitted on the same carrier as the second channel. For example, the first channel could be transmitted on a first exemplary carrier and the second channel could be transmitted on the first exemplary carrier.

In one embodiment, the first channel could be separated from the second channel in time domain by one or more different Orthogonal Frequency Division Multiplexing (OFDM) symbols.

Embodiments to prevent performing sidelink feedback transmissions on a plurality carriers exceeding a transmission capability of a UE are provided.

In a first embodiment, when a first UE wants and/or determines to perform unicast communication with a second UE, the first UE may perform a sidelink connection establishment with the second UE (e.g., the first UE may perform the sidelink connection establishment with the second UE to perform unicast communication with the second UE). In one embodiment, the first UE may be configured and/or pre-configured to perform one or more sidelink transmissions on a plurality of carriers. In one embodiment, the first UE could indicate one or more candidate carriers to the second UE via a first message (e.g., the first message may be transmitted via PC5 signaling information and/or an RRC message in Sidelink Control Channel (SCCH) transmitted to the second UE). For example, the one or more candidate carriers may be indicated to the second UE in a sidelink connection procedure and/or the sidelink connection establishment (e.g., the first message may be transmitted to the second UE in the sidelink connection procedure and/or the sidelink connection establishment). In some examples, the one or more candidate carriers may be selected and/or preferred by the first UE for establishing and/or maintaining a sidelink connection with the second UE. Alternatively and/or additionally, the second UE could select one, some and/or all of the one or more candidate carriers to perform one or more unicast transmissions and/or one or more unicast receptions in sidelink interface. In one embodiment, the first UE could provide information for indicating a number of selectable/preferable carriers (e.g., the first UE may transmit the information to the second UE and/or the information may be indicative of the number of selectable/preferable carriers). In one embodiment, the second UE could send a second message (e.g., the second message may be transmitted via PC5 signaling information and/or an RRC message in SCCH) to the first UE for indicating one or more carriers. For example, the second UE could send the second message (e.g., PC5 signaling information and/or an RRC message in SCCH) to the first UE, wherein the second message is indicative of the one or more carriers that are allowed, accepted and/or selected by the second UE. The one or more carriers may be selected by the second UE from amongst the one or more candidate carriers. Alternatively and/or additionally, a number of carriers of the one or more carriers may not exceed the number of selectable/preferable carriers.

By providing limited candidate carriers (e.g., the one or more candidate carriers), the first UE could limit potential sidelink transmissions to within a specific set of carriers (e.g., the one or more carriers, where the number of carriers of the one or more carriers does not exceed the number of selectable/preferable carriers), where the first UE is allowed to perform and/or is capable of performing transmission using the specific set of carriers concurrently and/or simultaneously. Accordingly, issues caused by UE transmission capability could be prevented and/or relieved.

In a second embodiment, a number of sidelink connections could be limited for a UE. Using a limited number of connections (e.g., a limited number of sidelink connections) may result in a reduction in transmission collision rates. For example, a UE could be limited to establish and/or to maintain a number N of connection(s) (e.g., the UE may merely establish and/or maintain one or more connections where a number of connections of the one or more connections does not exceed the number N). In one embodiment, the number N is configured by a network. Alternatively and/or additionally, the number N could be predefined in a specification. Alternatively and/or additionally, the number N could be configured within a service authorization (and/or within each service authorization). In one embodiment, the number N could be less than and/or equal to a maximum number of carriers that the UE is able to use at the same time (and/or a maximum number of carriers on which the UE is able to perform transmission concurrently and/or simultaneously). For example, a V2X layer of the UE could deliver a Non-Access Stratum (NAS) message (e.g., a Direct Request) for a sidelink connection to an Access Stratum (AS) layer of the UE. The AS layer of the UE may know and/or determine whether the UE is able to perform further feedback transmission other than feedback transmissions for one or more currently ongoing sidelink connections. Alternatively and/or additionally, the AS layer of the UE could accept and/or reject an NAS layer of the UE to perform a sidelink transmission of the NAS message. In an example where the UE is able to perform further feedback transmission, the AS layer could accept (e.g., allow) the NAS layer of the UE to perform the sidelink transmission of the NAS message and/or the UE could perform the sidelink transmission of the NAS message. In an example where the UE is not able to perform further feedback transmission, the AS layer could reject (e.g., not allow) the NAS layer of the UE to perform the sidelink transmission of the NAS message and/or the AS layer could indicate (e.g., inform) the NAS layer of the UE that the AS layer of the UE cannot create and/or establish an additional sidelink connection. If creating and/or establishing an additional sidelink connection is not possible (and/or exceeds a capability of the UE), the NAS layer of the UE could consider dropping one or more sessions for which one or more corresponding sidelink connections can be terminated and/or released. For example, an exemplary session may be dropped and/or a sidelink connection corresponding to the exemplary session may be terminated and/or released if a session (e.g., a new session) is initialized, where the session has higher priority than the exemplary session and/or the session is associated with a sidelink connection with feedback transmission. A session associated with a sidelink connection with feedback transmission may correspond to a session where the UE is configured, required, indicated and/or instructed to transmit feedback (e.g., a HARQ-ACK feedback and/or a PSFCH) to one or more UEs associated with the session responsive to receiving a message associated with the session.

In one embodiment, a connection and/or a sidelink connection could be a sidelink one-to-one connection. Alternatively and/or additionally, a connection and/or a sidelink connection could be a sidelink one-to-many connection.

Alternatively and/or additionally, connections and/or sidelink connections may only be sidelink one-to-one connections.

In one embodiment, a sidelink one-to-one connection could be defined based on a pair of source-destination identities. Alternatively and/or additionally, a sidelink one-to-one connection could be defined based on a source identity and/or a destination identity.

In a third embodiment, a first UE receives and/or decodes a first PSCCH from a second UE on a first carrier.

In one embodiment, the first UE may receive a first PSSCH scheduled by the first PSCCH. In some examples, the first PSSCH and PSCCH are in a same slot. For example, the first PSSCH being scheduled by the first PSCCH may correspond to the first PSCCH comprising scheduling information associated with the first PSSCH. The scheduling information may be indicative of one or more time resources and/or one or more frequency resources. For example, the first UE may determine the one or more time resources and/or the one or more frequency resources based upon the scheduling information and/or the first PSCCH. The first UE may receive the first PSSCH using the one or more time resources and/or the one or more frequency resources.

In one embodiment, the first UE is configured, required, indicated and/or instructed to transmit a HARQ-ACK feedback of the first PSSCH in a slot. For example, the HARQ-ACK feedback may be used (by the second UE and/or one or more UEs) to determine whether the first PSSCH and/or the first PSCCH are successfully received and/or decoded by the first UE. For example, a HARQ-ACK feedback comprising ACK may indicate that the first PSSCH and/or the first PSCCH are successfully received and/or decoded by the first UE. Alternatively and/or additionally, a HARQ-ACK feedback comprising NACK (e.g., negative acknowledgement) may indicate that the first PSSCH and/or the first PSCCH are not successfully received and/or decoded by the first UE. In some examples, responsive to not receiving a HARQ-ACK feedback associated with the first PSSCH and/or the first PSCCH, the second UE may retransmit the first PSSCH and/or the first PSCCH. Responsive to receiving a HARQ-ACK comprising ACK, the second UE does not retransmit the first PSSCH and/or the first PSCCH. Responsive to receiving a HARQ-ACK comprising NACK, the second UE may retransmit the first PSSCH and/or the first PSCCH.

In one embodiment, the first UE is required, indicated and/or instructed by the first PSCCH to transmit a first PSFCH on a second carrier.

In one embodiment, the slot could be a sidelink slot.

In one embodiment, the slot could be a resource in a sidelink resource pool.

In one embodiment, the slot could be slot n.

In one embodiment, the first carrier may be the same as the second carrier. Alternatively and/or additionally, the first carrier may be different than the second carrier.

In one embodiment, the first UE and/or the second UE could be aware of and/or could determine the first carrier and/or the second carrier.

In one embodiment, the slot is with a fixed relative time associated with a second slot where the first UE receives the first PSCCH. For example, a time between the slot and the second slot may be configured and/or fixed. For example, the time between the slot and the second slot may be stored in memory of the first UE. Alternatively and/or additionally, the time between the slot and the second slot may be determined based upon a message received by the first UE.

In one embodiment, the first UE is indicated, instructed and/or required to transmit one or more PSFCHs in the slot on one or more carriers other than the second carrier. For example, transmission of the one or more PSFCHs in the slot may be determined and/or derived based upon one or more signals (e.g., PSSCHs and/or PSCCHs) received by the first UE.

In one embodiment, if the first UE receives and/or decodes the first PSCCH successfully, the first UE may not transmit a HARQ-ACK of the first PSSCH on the second carrier in the slot.

For example, responsive to the first UE understanding, knowing and/or determining that the first UE could not meet a capability requirement of the first UE, the first UE may not transmit the HARQ-ACK of the first PSSCH on the second carrier in the slot. In some examples, the capability requirement of the first UE not being met may correspond to a capability of the first UE being exceeded. Alternatively and/or additionally, the capability requirement of the first UE not being met corresponds to the first UE not being allowed and/or able to transmit the HARQ-ACK of the first PSSCH on the second carrier in the slot. Alternatively and/or additionally, the capability requirement of the first UE not being met corresponds to the first UE not being allowed and/or able to transmit one or more signals and/or the HARQ-ACK on one or more carriers in the slot, wherein a number of carriers of the one or more carriers exceed may a number of TX RF chains associated with the first UE.

In one embodiment, the first UE may transmit the HARQ-ACK of the first PSSCH on a second PSFCH.

In one embodiment, the first UE may transmit the HARQ-ACK of the first PSSCH on a second PSCCH and/or a second PSSCH.

In one embodiment, the second PSFCH, the second PSCCH and/or the second PSSCH may not be the resource in the slot on the second carrier.

In one embodiment, the first UE may perform energy sensing based channel access procedure to access the second PSCCH, the second PSSCH and/or the PSFCH.

In one embodiment, when the first UE selects a resource for the second PSCCH, the second PSSCH and/or the second PSFCH, the first UE may exclude the resources in the slot on the second carrier.

In one embodiment, the second PSCCH and/or the second PSSCH may correspond to broadcast, groupcast and/or unicast.

In one embodiment, the second PSCCH, the second PSSCH and/or the second PSFCH is before a retransmission of the first PSCCH and/or the first PSSCH from the second UE. Accordingly, the HARQ-ACK may be received by the second UE before the second UE transmits the first PSCCH and/or the first PSSCH. Thus, in an example where the HARQ-ACK comprises ACK, the second UE may determine that the first PSCCH and/or the first PSSCH are successfully received and/or decoded by the first UE based upon the HARQ-ACK and/or the second UE may not retransmit the first PSCCH and/or the first PSSCH.

In one embodiment, the first UE may transmit an assistant information on a third carrier, wherein sidelink transmission on the third carrier could meet a capability of the first UE in the slot. In some examples, the capability of the first UE being met in the slot corresponds to the first UE being allowed and/or able to transmit the assistant information on the third carrier in the slot.

In one embodiment, the assistant information is related to the second PSFCH.

In one embodiment, the first UE could transmit the assistant information in the slot on the third carrier.

In one embodiment, the first UE may transmit the assistant information before the slot and/or after the slot.

In one embodiment, the first UE could transmit the assistant information on the second carrier before the slot and/or after the slot.

In one embodiment, the second UE could transmit the first PSCCH and/or the first PSSCH on the first carrier before the slot.

In one embodiment, the second UE may retransmit the first PSCCH and/or the first PSSCH, and/or the second UE may indicate the second PSFCH based on the assistant information.

In one embodiment, the second UE may not perform retransmission until the second UE receives the HARQ-ACK on the second PSFCH.

In one embodiment, if the second PSFCH could not meet the latency requirement, the second UE may retransmit the first PSCCH and/or the first PSSCH.

In a fourth embodiment, in a slot, if a UE is configured, required, indicated and/or instructed to transmit one or more PSFCHs on a plurality of carriers exceeding a capability of the UE (e.g., the capability may be related to a number of TX RF chains for transmitting sidelink transmission by the UE), the UE may drop and/or not transmit one or more PSFCHs on a subset of carriers of the plurality of carriers to meet the capability of the UE. In some examples, in the slot, the UE transmits PSFCH(s) on the plurality of carriers excluding the subset of carriers. For example, carriers, of the plurality of carriers, excluding the subset of carriers, may have a second number of carriers that meets the capability of the UE. For example, the UE may be able and/or allowed to perform transmissions of PSFCHs on the carriers, of the plurality of carriers, excluding the subset of carriers, concurrently and/or simultaneously (e.g., the second number of carriers may be less than and/or equal to the number of TX RF chains). The one or more PSFCHs may be associated with same or different UEs. example, in FIG. 8, a fourth UE "UE 4" receives the PSCCH 1 and/or the PSSCH 1 from a first UE "UE 1" in the first carrier "Carrier 1", the fourth UE receives the PSCCH 2 and/or the PSSCH 2 from a second UE "UE 2" in the second carrier "Carrier 2" and/or the fourth UE "UE 4" receives the PSCCH 3 and/or the PSSCH 3 from a third UE "UE 3" in the third carrier "Carrier 3". In some examples, PSCCH i and/or PSSCH i is unicast between the fourth UE "UE 4" and a UE i (e.g., PSCCH i corresponds to one or more of the PSCCH 1, the PSCCH 2 and/or the PSCCH 3, PSSCH i corresponds to one or more of the PSSCH 1, the PSSCH 2 and/or the PSSCH 3 and/or UE i corresponds to one or more of the first UE "UE 1", the second UE "UE 2" and/or the third UE "UE 3"). In this example, the first UE "UE 1", the second UE "UE 2" and/or the third UE "UE 3" may be same UE or different UEs. The fourth UE "UE 4" may transmit a sidelink HARQ-ACK associated with PSCCH i and/or PSSCH i on PSFCH i to UE i.

In one embodiment, the subset of carriers could be one, some and/or all of the plurality of carriers.

In one embodiment, the UE determines and/or selects the subset of carriers based on random selection. For example, the UE may randomly select one or more exemplary carriers, of the plurality of carriers, for inclusion in the subset of carriers.

In one embodiment, the UE determines and/or selects the subset of carriers based on an ascending and/or descending order of carrier indexes associated with the plurality of carriers. For example, the subset of carriers may comprise one or more carriers associated with one or more lowest carrier indexes from the plurality of carriers. Alternatively and/or additionally, the subset of carriers may comprise one or more carriers associated with one or more highest carrier indexes from the plurality of carrier. In some examples, the UE may prioritize transmissions of PSFCHs based upon an ascending and/or descending order of carrier indexes from the plurality of carriers. For example, the UE may prioritize transmission of a first exemplary PSFCH over transmission of a second exemplary PSFCH if a carrier associated with the first exemplary PSFCH is associated with a lower carrier index than a carrier associated with the second exemplary PSFCH. Alternatively and/or additionally, the UE may prioritize transmission of a first exemplary PSFCH over transmission of a second exemplary PSFCH if a carrier associated with the first exemplary PSFCH is associated with a higher carrier index than a carrier associated with the second exemplary PSFCH.

In one embodiment, the UE determines and/or selects the subset of carriers based on a HARQ-ACK content of a PSFCH. In one embodiment, if the UE determines and/or derives to transmit NACK on a PSFCH on a carrier of the plurality of carriers, the UE may select the carrier for inclusion in the subset of carriers. In some examples, the capability of the UE being exceeded corresponds to the UE not being allowed and/or able to concurrently transmit one or more signals comprising one or more PSFCHs on one or more carriers comprising the carrier. Alternatively and/or additionally, the capability of the UE being exceeded corresponds to the number of carriers of the one or more carriers exceeding a number of TX RF chains associated with the UE. In one embodiment, the UE may prioritize transmission of a first exemplary PSFCH over transmission of a second exemplary PSFCH if a first exemplary HARQ-ACK of the first exemplary PSFCH corresponds to ACK and/or a second exemplary HARQ-ACK of the second exemplary PSFCH corresponds to NACK. The motivation is a peer/pair UE performs retransmission in response to receiving NACK from the second exemplary PSFCH such that either receiving NACK or not receiving HARQ-ACK may cause the peer/pair UE to perform retransmission.

In one embodiment, the UE determines and/or selects the subset of carriers based on an ascending and/or descending order of priority values. In one embodiment, a priority value of the priority values is indicated by a PSCCH and/or a PSSCH. In one embodiment, a priority value is indicated by a sidelink control information (SCI). In one embodiment, a priority value could be indicative of a priority of a PSSCH. In one embodiment, a lowest priority value of the priority values corresponds to a highest priority of priorities associated with the priority values. Alternatively and/or additionally, a highest priority value of the priority values corresponds to a highest priority of the priorities. In some examples, the subset of carriers may comprise one or more carriers associated with one or more PSSCHs (and/or one or more PSCCHs) associated with one or more lowest priorities of the priorities. In some examples, the UE may prioritize transmissions of PSFCHs based upon an ascending and/or descending order of the priority values. For example, the UE may prioritize transmission of a first exemplary PSFCH over transmission of a second exemplary PSFCH if a PSSCH (and/or a PSCCH) associated with the first exemplary PSFCH is associated with a higher priority than a PSSCH (and/or a PSCCH) associated with the second exemplary PSFCH.

In an example, in FIG. 8, a priority value of PSSCH 3 may be larger than a priority value of PSSCH 2 and/or a priority value of PSSCH 1. In the example, a priority of the PSSCH 3 may be lower than a priority of the PSSCH 2 and/or a priority of the PSSCH 1. In the example, the UE may select the third carrier "Carrier 3" associated with the PSSCH 3 for inclusion in the subset of carriers. In one embodiment, the UE may not transmit PSFCH 3 on the third carrier "Carrier 3". Alternatively and/or additionally, transmission of the PSFCH 1 on the first carrier "Carrier 1" and/or transmission of the PSFCH 2 on the second carrier "Carrier 2" may be prioritized over transmission of the PSFCH 3 on the third carrier "Carrier 3". Alternatively and/or additionally, the UE does not transmit an overlapped portion of the PSFCH 3 and/or the UE may transmit a non-overlapped portion of PSFCH 3. In some examples, the overlapped portion of the PSFCH 3 corresponds to a portion of the PSFCH 3 overlapping with the PSFCH 2 and/or the PSFCH 1. In some examples, the non-overlapped portion of the PSFCH 3 corresponds to a portion of the PSFCH 3 that does not overlap with the PSFCH 2 and/or the PSFCH 1. Alternatively and/or additionally, the UE does not transmit a set of symbols for PSFCH 3, wherein the set of symbols starts from a first overlapped symbol of the overlapped portion of the PSFCH 3 (e.g., the first overlapped symbol may correspond to a first symbol that overlaps with the PSFCH 1 and/or the PSFCH 2).

In one embodiment, the UE determines and/or selects the subset of carriers based on a receiving and/or decoding timing order of PSCCH. For example, the subset of carriers may be determined and/or selected based upon an order in which PSCCHs are received and/or decoded. In some examples, the subset of carriers may comprise one or more first exemplary carriers associated with one or more first exemplary PSCCHs and/or the subset of carriers may not comprise one or more second exemplary carriers associated with one or more second exemplary PSCCHs if the one or more first exemplary PSCCHs are received and/or decoded after the one or more second exemplary PSCCHs are received and/or decoded. Alternatively and/or additionally, the subset of carriers may comprise one or more first exemplary carriers associated with one or more first exemplary PSCCHs and/or the subset of carriers may not comprise one or more second exemplary carriers associated with one or more second exemplary PSCCHs if the one or more first exemplary PSCCHs are received and/or decoded before the one or more second exemplary PSCCHs are received and/or decoded. In some examples, the UE may prioritize transmissions of PSFCHs based upon an ascending and/or descending order of the priority values. For example, the UE may prioritize transmission of a first exemplary PSFCH over transmission of a second exemplary PSFCH if a PSCCH associated with the first exemplary PSFCH is received and/or decoded before a PSCCH associated with the second exemplary PSFCH is received and/or decoded. Alternatively and/or additionally, the UE may prioritize transmission of a first exemplary PSFCH over transmission of a second exemplary PSFCH if a PSCCH associated with the first exemplary PSFCH is received and/or decoded after a PSCCH associated with the second exemplary PSFCH is received and/or decoded.

In an example, in FIG. 8, if slot n-u associated with the PSCCH 3 is after slot n-k associated with the PSCCH 1 and/or slot n-j associated with the PSCCH 2, the first UE may select the third carrier "Carrier 3" associated with the PSCCH 3 for inclusion in the subset of carriers. Alternatively and/or additionally, transmission of the PSFCH 1 on the first carrier "Carrier 1" and/or transmission of the PSFCH 2 on the second carrier "Carrier 2" may be prioritized over transmission of the PSFCH 3 on the third carrier "Carrier 3". In another example, if slot n-u is before slot n-k and/or slot n-j, the first UE may select the third carrier "Carrier 3" for inclusion in the subset of carriers. Alternatively and/or additionally, transmission of the PSFCH 1 on the first carrier "Carrier 1" and/or transmission of the PSFCH 2 on the second carrier "Carrier 2" may be prioritized over transmission of the PSFCH 3 on the third carrier "Carrier 3".

In one embodiment, the UE determines and/or selects the subset of carriers based on an ascending and/or descending order of numerologies of carriers. For example, the subset of carriers may comprise one or more carriers associated with one or more lowest numerologies of a plurality of numerologies associated with the plurality of carriers. Alternatively and/or additionally, the subset of carriers may comprise one or more carriers associated with one or more highest numerologies of the plurality of numerologies associated with the plurality of carriers. In some examples, the UE may prioritize transmissions of PSFCHs based upon an ascending and/or descending order of the plurality of numerologies associated with the plurality of carriers. For example, the UE may prioritize transmission of a first exemplary PSFCH over transmission of a second exemplary PSFCH if a carrier associated with the first exemplary PSFCH is associated with a lower numerology than a carrier associated with the second exemplary PSFCH. Alternatively and/or additionally, the UE may prioritize transmission of a first exemplary PSFCH over transmission of a second exemplary PSFCH if a carrier associated with the first exemplary PSFCH is associated with a higher numerology than a carrier associated with the second exemplary PSFCH.

In one embodiment, the UE determines and/or selects the subset of carriers based on an ascending and/or descending order of subcarrier spacings of carriers. For example, the subset of carriers may comprise one or more carriers associated with one or more lowest subcarrier spacings of a plurality of subcarrier spacings associated with the plurality of carriers. Alternatively and/or additionally, the subset of carriers may comprise one or more carriers associated with one or more highest subcarrier spacings of the plurality of subcarrier spacings associated with the plurality of carriers. In some examples, the UE may prioritize transmissions of PSFCHs based upon an ascending and/or descending order of the plurality of subcarrier spacings associated with the plurality of carriers. For example, the UE may prioritize transmission of a first exemplary PSFCH over transmission of a second exemplary PSFCH if a carrier associated with the first exemplary PSFCH is associated with a lower subcarrier spacing than a carrier associated with the second exemplary PSFCH. Alternatively and/or additionally, the UE may prioritize transmission of a first exemplary PSFCH over transmission of a second exemplary PSFCH if a carrier associated with the first exemplary PSFCH is associated with a higher subcarrier spacing than a carrier associated with the second exemplary PSFCH.

In one embodiment, a subcarrier spacing of a carrier could be one or more of {15 kHz, 30 kHz, 60 kHz, 120 kHz, 240 kHz}. In an example, in FIG. 8, the first carrier "Carrier 1" may have 30 kHz subcarrier spacing, the second carrier "Carrier 2" may have 60 kHz subcarrier spacing and/or the third carrier "Carrier 3" may have 15 kHz subcarrier spacing. In one embodiment, the UE may prioritize transmission of the PSFCH 1 on the first carrier "Carrier 1" and transmission of the PSFCH 3 on the third carrier "Carrier 3" over transmission of the PSFCH 2 on the second carrier "Carrier 2" (and/or the UE may select the second carrier "Carrier 2" for inclusion in the subset of carriers). Alternatively and/or additionally, the UE may prioritize transmission of the PSFCH 2 on the second carrier "Carrier 2" and transmission of the PSFCH 3 on the third carrier "Carrier 3" over transmission of the PSFCH 1 on the first carrier "Carrier 1" (and/or the UE may select the first carrier "Carrier 1" for inclusion in the subset of carriers).

In one embodiment, the UE determines and/or selects the subset of carriers based on characteristics of PSSCHs and/or PSCCHs.

In one embodiment, the UE determines and/or selects the subset of carriers based upon whether a PSFCH is associated with a unicast PSSCH or a groupcast PSSCH. For example, if the UE determines and/or derives to transmit a PSFCH on a carrier for carrying HARQ-ACK associated with a groupcast PSSCH and/or the number of carriers (associated with concurrent transmission) exceeds the capability of the UE, the UE may select the carrier for inclusion in the subset of carriers. In one embodiment, the UE prioritizes a PSFCH for carrying HARQ-ACK for a unicast PSSCH over a PSFCH for carrying HARQ-ACK for a groupcast PSSCH. For example, the UE may prioritize transmission of a first exemplary PSFCH over transmission of a second exemplary PSFCH if a first exemplary HARQ-ACK of the first exemplary PSFCH is associated with a unicast PSSCH and/or a second exemplary HARQ-ACK of the second exemplary PSFCH is associated with a groupcast PSSCH.

For example, in FIG. 8, if PSSCH 3 is a groupcast transmission, PSSCH 1 is a unicast PSSCH and/or PSSCH 2 is a unicast PSSCH, the UE may prioritize transmission of the PSFCH 1 on the first carrier "Carrier 1" and transmission of the PSFCH 2 on the second carrier "Carrier 2" over transmission of the PSFCH 3 on the third carrier "Carrier 3". Alternatively and/or additionally, the UE may select the third carrier "Carrier 3" associated with the PSFCH 3 for inclusion in the subset of carriers.

In a fifth embodiment, when TX power (e.g., transmit power) of a first UE could not satisfy concurrent (and/or simultaneous) transmission of a first PSFCH transmission and a second PSFCH transmission, the UE could perform power scaling for the first PSFCH and/or the second PSFCH. In the fifth embodiment, one or more transmitted powers for the first PSFCH and/or the second PSFCH may be reduced and/or lowered. For example, a transmitted power of one of the first PSFCH and/or the second PSFCH may be reduced and/or lowered. Alternatively and/or additionally, a transmitted power of the first PSFCH and a transmitted power of the second PSFCH may be reduced and/or lowered.

In one embodiment, the first PSFCH is partly and/or fully overlapped with the second PSFCH in the time domain.

In one embodiment, the first UE could transmit the first PSFCH on a first carrier.

In one embodiment, the first UE could transmit the second PSFCH on a second carrier.

In one embodiment, the first carrier could be the same as the second carrier.

In one embodiment, the first carrier could be different than the second carrier.

In one embodiment, the first UE transmits the first PSFCH with a first power.

In one embodiment, the first UE transmits the second PSFCH with a second power.

In one embodiment, if the first UE could not concurrently and/or simultaneously transmit the first PSFCH with the first power and the second PSFCH with the second power, the first UE performs power scaling on one or more of the first PSFCH and the second PSFCH. For example, the first UE may perform power scaling on one of the first PSFCH and the second PSFCH. Alternatively and/or additionally, the first UE may perform power scaling on both of the first PSFCH and the second PSFCH.

In one embodiment, the first PSFCH is indicated by a second UE.

In one embodiment, the second PSFCH is indicated by a third UE. In one embodiment, the second UE is different than the third UE.

In one embodiment, the first PSFCH is associated with a first PSCCH and/or a first PSSCH transmitted by the second UE.

In one embodiment, the second PSFCH is associated with a second PSCCH and/or a second PSSCH transmitted by the third UE.

In one embodiment, the first UE transmits the first PSFCH with a first scaled power based upon the first power. For example, the first power may be scaled to the first scaled power.

In one embodiment, the first UE transmits the second PSFCH with a second scaled power based upon the second power. For example, the second power may be scaled to the second scaled power.

In one embodiment, the first UE determines and/or selects a channel for power scaling based on priority value associated with the channel. For example, the first UE may determine and/or select the first PSFCH and/or the second PSFCH for power scaling based upon a first priority value associated with the first PSCCH and/or the first PSSCH and/or a second priority value associated with the second PSCCH and/or the second PSSCH.

In one embodiment, the first UE performs power scaling on the first power associated with the first PSFCH if the first PSFCH carries NACK and the second PSFCH carries ACK.

In one embodiment, the first UE determines a channel for power scaling based on characteristics of the channel. For example, the first UE may determine and/or select one or more of the first PSFCH and/or the second PSFCH for power scaling based upon one or more first characteristics of the first PSCCH and/or the first PSSCH and/or one or more second characteristics of the second PSCCH and/or the second PSSCH.

In one embodiment, if the first priority value associated with the first PSCCH and/or the first PSSCH is smaller than the second priority value associated with the second PSCCH and/or the second PSSCH, the first UE performs power scaling on the first PSFCH.

In one embodiment, if the first priority value associated with the first PSCCH and/or the first PSSCH is larger than the second priority value associated with the second PSCCH and/or the second PSSCH, the first UE performs power scaling on the second PSFCH.

Figure 9:
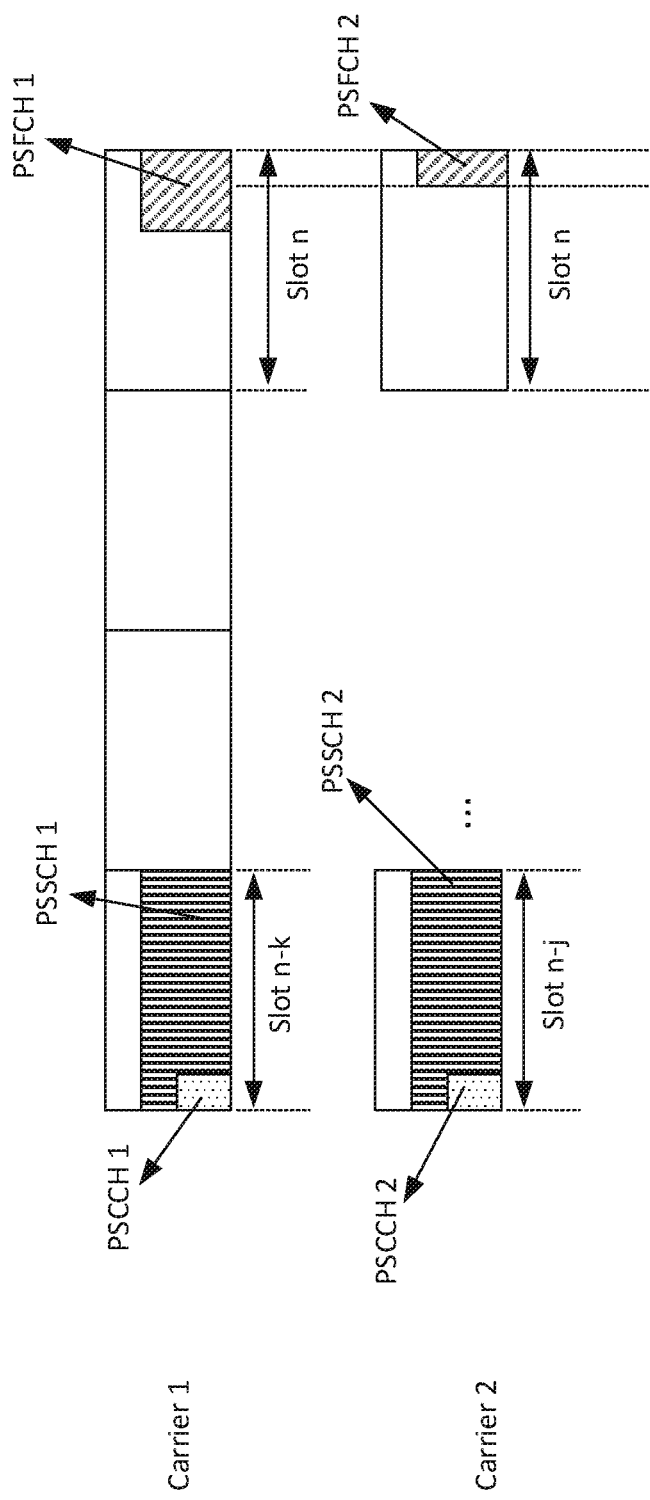
FIG. 9 illustrates an exemplary scenario associated with a configuration of carriers and/or slots associated with sidelink transmission.

FIG. 9 illustrates an exemplary scenario associated with the fifth embodiment. In the exemplary scenario, a UE could transmit sidelink transmission concurrently and/or simultaneously on 2 carriers. The UE may be required, indicated and/or instructed to transmit, in slot n, PSFCH 1 on a first carrier "Carrier 1" and PSFCH 2 on a second carrier "Carrier 2". For example, PSCCH 1 may be received and/or decoded in slot n-k on the first carrier "Carrier 1". The UE may receive, within the slot n-k and/or a different slot, PSSCH 1 scheduled by the PSCCH 1. PSFCH 1 may be configured to carry a signal (e.g., a HARQ-ACK and/or a different signal) associated with the PSCCH 1 and/or the PSSCH 1. For example, transmission of the PSFCH 1 in the slot n may be determined and/or derived based upon the PSCCH 1 and/or the PSSCH 1. Alternatively and/or additionally, PSCCH 2 may be received and/or decoded in slot n-j on the second carrier "Carrier 2". The UE may receive, within the slot n-j and/or a different slot, PSSCH 2 scheduled by the PSCCH 2. The PSFCH 2 may be configured to carry a signal (e.g., a HARQ-ACK and/or a different signal) associated with the PSCCH 2 and/or the PSSCH 2. For example, transmission of the PSFCH 2 in the slot n may be determined and/or derived based upon the PSCCH 2 and/or the PSSCH 2. In one embodiment, PSFCH 1 is partly or fully overlapped with PSFCH 2 in time domain. In one embodiment, the UE derives and/or determines a transmitted power P1 for PSFCH 1 and a transmitted power P2 for PSFCH 2. For example, the transmitted power P1 may be derived and/or determined based upon the PSCCH 1 and/or the PSSCH 1 and/or the transmitted power P2 may be derived based upon the PSCCH 2 and/or the PSSCH 2. Alternatively and/or additionally, the transmitted power P1 and/or the transmitted power P2 may be derived and/or determined based upon a configuration of the UE and/or based upon power information stored on the UE (e.g., the power information may be stored as a default setting and/or the power information may be generated based upon one or more selections and/or measurements by the UE). In one embodiment, for a part of the slot n where PSFCH 1 overlaps with PSFCH 2, the UE could not transmit the PSFCH 1 with the transmitted power P1 and the PSFCH 2 with the transmitted power P2. In this situation, the UE may perform power scaling on the PSFCH 1 and/or the PSFCH 2.

In one embodiment, the UE may determine and/or select a channel (from amongst the PSFCH 1 and/or the PSFCH 2) for performing power scaling based on an ascending and/or descending order of priority values. In one embodiment, in this example, if the PSSCH 1 has a lower priority value (and/or a higher priority) than the PSSCH 2, the UE would perform power scaling on the PSFCH 2 (e.g., lower priority value may imply and/or may correspond to higher priority and/or higher importance). Alternatively and/or additionally, the UE may perform power scaling on PSFCH 1 and/or the transmitted power P1.

In one embodiment, the UE may determine and/or select a channel for performing power scaling based on HARQ-ACK contents of the PSFCH 1 and/or the PSFCH 2. In this example, if the PSFCH 1 carries NACK, the UE may perform power scaling on PSFCH 1 and/or the transmitted power P1.

In one embodiment, the UE may determine and/or select a channel for performing power scaling based on receiving and/or decoding timing order of PSCCH. For example, the UE may determine and/or select a channel for performing power scaling based on an order in which the PSCCH 1 and the PSCCH 2 are received and/or decoded. In this example, if slot n-k associated with the PSCCH 1 is before slot n-j associated with the PSCCH 2, the UE may perform power scaling on the PSFCH 1 and/or the transmitted power P1. Alternatively and/or additionally, the UE would perform power scaling on the PSFCH 2.

In one embodiment, the UE may determine and/or select a channel for performing power scaling based on an ascending and/or descending order of numerologies and/or subcarrier spacings of carriers associated with the PSFCH 1 and/or the PSFCH 2. In this example, if carrier 1 has 15 kHz subcarrier spacing and carrier 2 has 60 kHz subcarrier spacing, the UE may perform power scaling on the PSFCH 1 and/or the transmitted power P1. Alternatively and/or additionally, the UE may perform power scaling on the PSFCH 2.

In one embodiment, the UE may determine and/or select a channel for performing power scaling based on characteristics of the PSSCH 1, the PSCCH 1, the PSSCH 2 and/or the PSCCH 2. In this example, if the PSSCH 1 is groupcast and/or the PSSCH 2 is unicast, the UE would perform power scaling on the PSFCH 1 and/or the transmitted power P1. For example, priority of unicast sidelink transmission is higher and/or more important than groupcast sidelink transmission.

In one embodiment, the UE may determine and/or select a channel for performing power scaling by prioritizing one or more of the PSFCH 1 and the PSFCH 2 (such as by using one or more of the techniques described with respect to the fourth embodiment). In an example where the UE prioritizes transmission of the PSFCH 2 over transmission of the PSFCH 1, the UE may determine and/or select the PSFCH 1 for power scaling (and/or the UE may perform power scaling on the PSFCH 1 and/or the transmitted power P1).

In one embodiment, responsive to the UE performing power scaling, the UE could transmit PSFCH 1 and PSFCH 2 concurrently and/or simultaneously.

In one embodiment, the UE could transmit PSFCH 1 with the transmitted power P1 and PSFCH 2 with a transmitted power P2', (e.g., the transmitted power P2 may be scaled (e.g., reduced and/or lowered) to the transmitted power P2').

In one embodiment, the UE could transmit PSFCH 1 with a transmitted power P1' (e.g., the transmitted power P1 may be scaled to the transmitted power P1') and PSFCH 2 with the transmitted power P2'.

In one embodiment, the UE could transmit PSFCH 1 with a transmitted power P1" (e.g., the transmitted power P1 and/or the transmitted power P1' may be scaled to the transmitted power P1") and PSFCH 2 with a transmitted power P2" (e.g., the transmitted power P2 and/or the transmitted power P2' may be scaled to the transmitted power P2").

In one embodiment, the transmitted power P1' is smaller than the transmitted power P1.

In one embodiment, the transmitted power P2' is smaller than the transmitted power P2.

In one embodiment, the transmitted power P1" is smaller than the transmitted power P1.

In one embodiment, the transmitted power P2" is smaller than the transmitted power P2.

In one embodiment, the transmitted power P1' could be the same and/or different than the transmitted power P1".

In one embodiment, the transmitted power P2' could be the same and/or different than the transmitted power P2".

In one embodiment, the UE would transmit PSFCH 1 with the transmitted power P1 and/or the transmitted power P1', and does not transmit PSFCH 2. For example, the UE performs power scaling on PSFCH 2, and a transmitted power for PSFCH 2 is scaled to zero. Transmitted power for PSFCH 2 being derived as zero means and/or implies that the UE does not transmit PSFCH 2 and/or the UE drops PSFCH 2 and/or the UE does not concurrently transmit the two PSFCHs (e.g., PSFCH 1, PSFCH 2) and/or the UE only transmits PSFCH 1.

In one embodiment, the UE would transmit PSFCH 2 with the transmitted power P2 and/or the transmitted power P2', and does not transmit PSFCH 1. For example, the UE performs power scaling on PSFCH 1, and a transmitted power for PSFCH 1 is scaled to zero. Transmitted power for PSFCH 1 being derived as zero means and/or implies that the UE does not transmit PSFCH 1 and/or the UE drops PSFCH 1 and/or the UE does not concurrently transmit the two PSFCHs (e.g., PSFCH 1, PSFCH 2) and/or the UE only transmits PSFCH 2.

In one embodiment, the transmitted power P1, the transmitted power P1', the transmitted power P1", the transmitted power P2, the transmitted power P2' and/or the transmitted power P2" are smaller than and/or equal to an allowed and/or configured (and/or pre-configured) maximum transmitted power.

One, some and/or all of the foregoing concepts can be formed to a new concept and/or embodiment.

In some examples, each of the first embodiment, the second embodiment, the third embodiment, the fourth embodiment and the fifth embodiment, may be implemented independently and/or separately. Alternatively and/or additionally, a combination of two or more of the first embodiment, the second embodiment, the third embodiment, the fourth embodiment and/or the fifth embodiment may be implemented. Alternatively and/or additionally, a combination of two or more of the first embodiment, the second embodiment, the third embodiment, the fourth embodiment and/or the fifth embodiment may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 10:
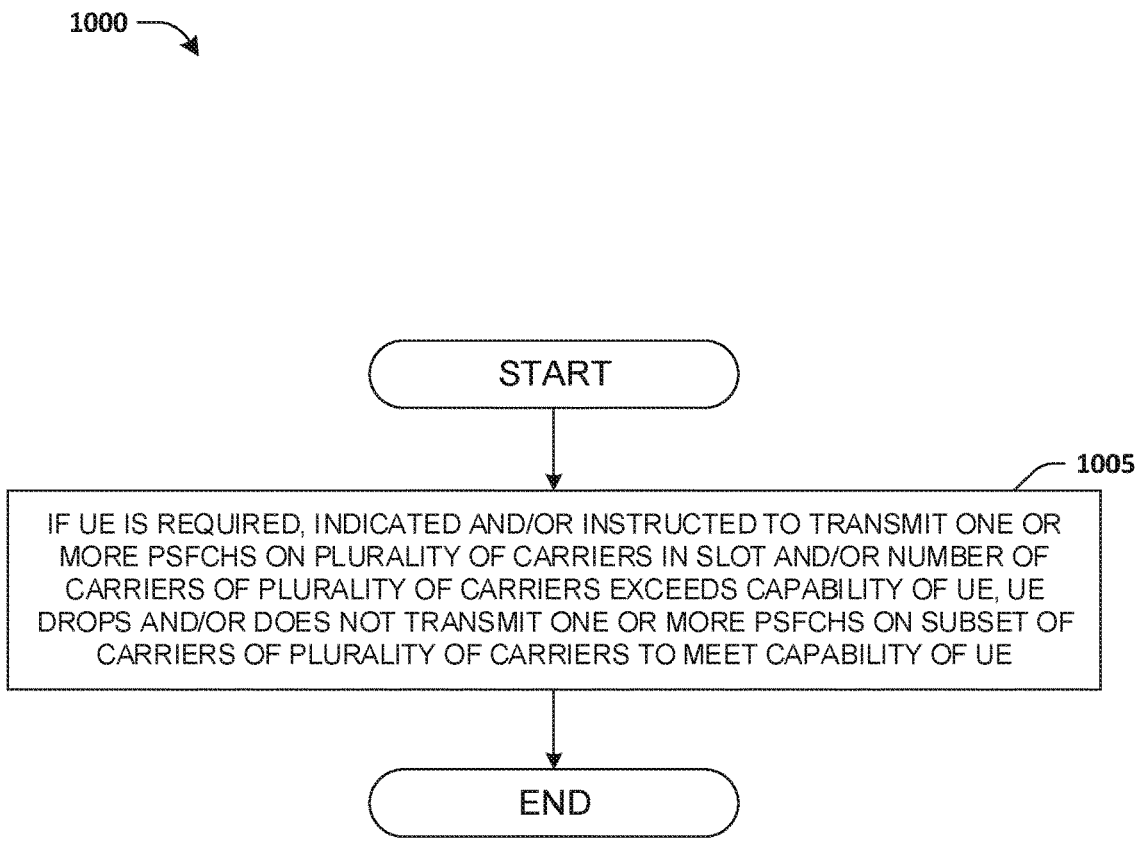
FIG. 10 is a flow chart according to one exemplary embodiment.

FIG. 10 is a flow chart 1000 according to one exemplary embodiment from the perspective of a UE. In step 1005, if the UE is required, indicated and/or instructed to transmit one or more PSFCHs on a plurality of carriers in a slot and/or a number of carriers of the plurality of carriers exceeds a capability of the UE, the UE drops and/or does not transmit one or more PSFCHs on a subset of carriers of the plurality of carriers to meet the capability of the UE.

In one embodiment, the capability of the UE corresponds to a TX RF chain number (e.g., a number of TX RF chains associated with the UE) for transmitting sidelink transmissions.

In one embodiment, the slot is a sidelink slot.

In one embodiment, the slot is a resource configured in a sidelink resource pool.

In one embodiment, the UE determines and/or selects the subset of carriers based on random selection.

In one embodiment, the UE determines and/or selects the subset of carriers based on an ascending and/or descending order of carrier indexes associated with the plurality of carriers.

In one embodiment, the UE determines and/or selects the subset of carriers based on HARQ-ACK content of a PSFCH.

In one embodiment, if the UE determines and/or derives to transmit NACK on a PSFCH on a carrier of the plurality of carriers and/or the number of carriers does not meet the capability of the UE, the first UE may select the carrier for inclusion in the subset of carriers.

In one embodiment, the UE determines and/or selects the subset of carriers based on an ascending and/or descending order of priority values. In one embodiment, a priority value of the priority values is indicated by a PSCCH and/or a PSSCH. In one embodiment, a priority value could be indicative of a priority of a PSSCH.

In one embodiment, the UE determines and/or selects the subset of carriers based on a receiving and/or decoding timing order of PSCCH. For example, the subset of carriers may be determined and/or selected based upon an order in which PSCCHs are received and/or decoded.

In one embodiment, the UE determines and/or selects the subset of carriers based on an ascending and/or descending order of numerologies of carriers.

In one embodiment, the UE determines and/or selects the subset of carriers based on an ascending and/or descending order of subcarrier spacings of carriers.

In one embodiment, the UE de-prioritizes one or more carriers if the one or more carriers have one or more lowest subcarrier spacings of a plurality of subcarrier spacings associated with the plurality of carriers. De-prioritizing a carrier may correspond to selecting the carrier for inclusion in the subset of carriers.

In one embodiment, the UE determines and/or selects the subset of carriers based on characteristics of PSSCHs and/or PSCCHs.

In one embodiment, the UE prioritizes a PSFCH for carrying HARQ-ACK for a unicast PSSCH over a PSFCH for carrying HARQ-ACK for a groupcast PSSCH.

Referring back to FIGS. 3 and 4, in one exemplary embodiment of a UE, the device 300 includes a program code 312 stored in the memory 310. The CPU 308 could execute program code 312 to enable the UE to drop and/or not transmit one or more PSFCHs on a subset of carriers of a plurality of carriers if the UE is required, indicated and/or instructed to transmit one or more PSFCHs on a plurality of carriers in a slot and/or a number of carriers of the plurality of carriers exceeds a capability of the UE. Furthermore, the CPU 308 can execute the program code 312 to perform one, some and/or all of the above-described actions and steps and/or others described herein.

Figure 11:
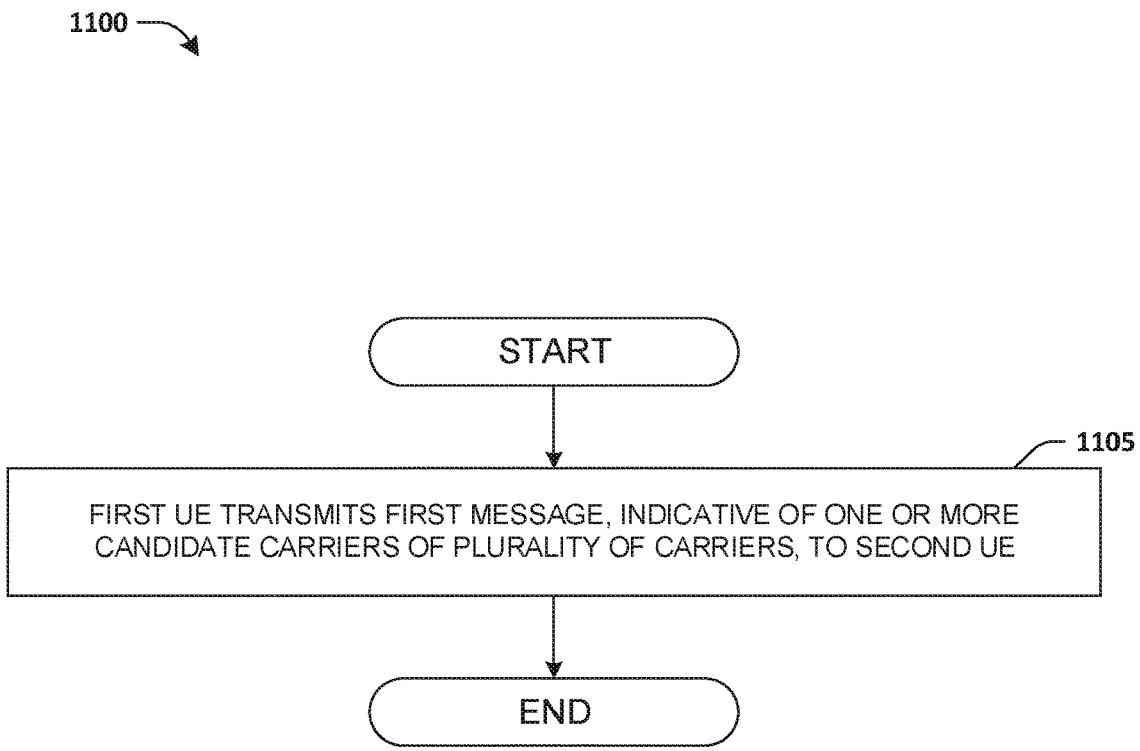
FIG. 11 is a flow chart according to one exemplary embodiment.

FIG. 11 is a flow chart 1100 according to one exemplary embodiment from the perspective of a first UE configured (and/or pre-configured) to perform one or more sidelink transmissions on a plurality of carriers. In step 1105, the first UE transmits a first message, indicative of one or more candidate carriers of the plurality of carriers, to a second UE.

In one embodiment, the first UE receives a second message from the second UE via a PC5 Signaling (PC5-S) information (e.g., a PC5-S signal and/or a PC5-S message) or a PC5-RRC message after the transmission of the first message.

In one embodiment, the first message is transmitted via a PC5 Signaling (PC5-S) information (e.g., a PC5-S signal and/or a PC5-S message) or a PC5-RRC message.

In one embodiment, the one or more candidate carriers are selected and/or preferred by the first UE for establishing and/or maintaining a sidelink connection with the second UE. For example, the one or more candidate carriers may be selected and/or preferred by the first UE based upon a device configuration of the first UE supporting use of the one or more candidate carriers for establishing and/or maintaining a sidelink connection with the second UE. For example, carrier information indicative of carriers supported by the configuration of the first UE may be stored on the first UE (e.g., the carrier information may be stored as a default setting and/or the carrier information may be generated based upon one or more selections and/or measurements by the first UE). Alternatively and/or additionally, the one or more candidate carriers may be selected and/or preferred by the first UE based upon a determination that the one or more candidate carriers are associated with one or more qualities higher than a threshold quality. For example, the first UE may determine a quality of a carrier by measuring a quality of transmission and/or reception via the carrier. Alternatively and/or additionally, the one or more candidate carriers may be selected and/or preferred by the first UE based upon a determination that the one or more candidate carriers are associated with one or more qualities higher than one or more qualities of one or more second carriers of the plurality of carriers different than the one or more candidate carriers.

In one embodiment, sidelink transmissions and/or sidelink connections (and/or all potential sidelink transmissions and/or potential sidelink connections) may be limited to being performed, established and/or maintained using the one or more candidate carriers on which the first UE is able to perform sidelink transmissions concurrently and/or simultaneously.

In one embodiment, the second message is indicative of one or more carriers, of the one or more candidate carriers, authorized by the second UE. For example, the one or more carriers may be allowed, accepted and/or selected by the second UE from amongst the one or more candidate carriers. In one embodiment, the one or more carriers may be authorized (e.g., allowed, accepted and/or selected) by the second UE based upon a configuration of the second UE supporting use of the one or more carriers for establishing and/or maintaining a sidelink connection with the first UE. For example, carrier information indicative of carriers supported by the configuration of the second UE may be stored on the second UE (e.g., the carrier information may be stored as a default setting and/or the carrier information may be generated based upon one or more selections and/or measurements by the second UE). Alternatively and/or additionally, the one or more carriers may be authorized (e.g., allowed, accepted and/or selected) by the second UE based upon a determination that the one or more carriers are associated with one or more qualities higher than a threshold quality. For example, the second UE may determine a quality of a carrier by measuring a quality of transmission and/or reception via the carrier. Alternatively and/or additionally, the one or more carriers may be authorized (e.g., allowed, accepted and/or selected) by the second UE based upon a determination that the one or more carriers are associated with one or more qualities higher than one or more qualities of one or more second carriers of the one or more candidate carriers different than the one or more carriers. In one embodiment, the one or more carriers may comprise one, some and/or all of the one or more candidate carriers.

In one embodiment, the first UE establishes and/or maintains a sidelink connection with the second UE on the one or more carriers.

Referring back to FIGS. 3 and 4, in one exemplary embodiment of a first UE configured to perform one or more sidelink transmissions on a plurality of carriers, the device 300 includes a program code 312 stored in the memory 310. The CPU 308 could execute program code 312 to enable the first UE to transmit a first message, indicative of one or more candidate carriers of the plurality of carriers, to a second UE. Furthermore, the CPU 308 can execute the program code 312 to perform one, some and/or all of the above-described actions and steps and/or others described herein.

Figure 12:
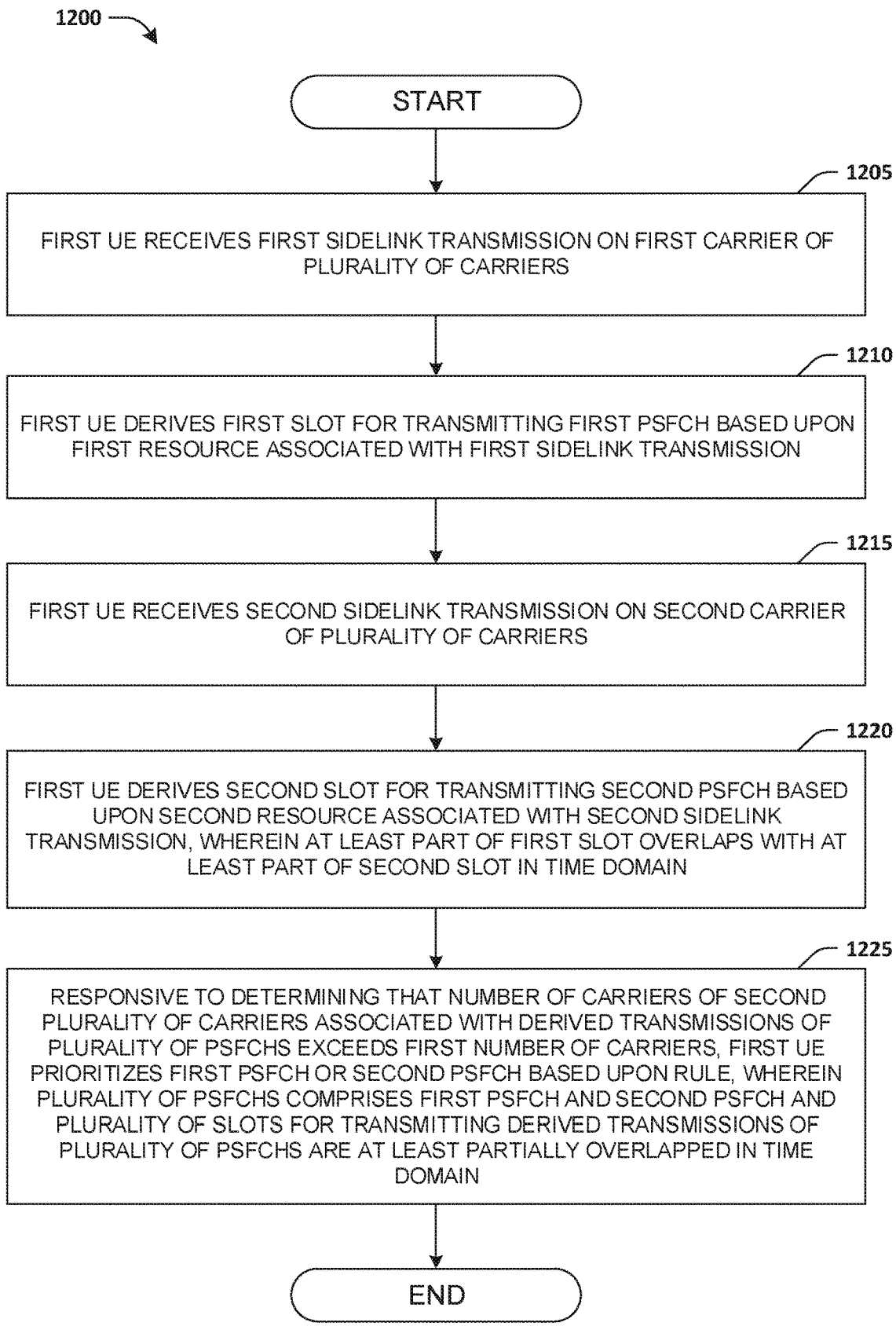
FIG. 12 is a flow chart according to one exemplary embodiment.

FIG. 12 is a flow chart 1200 according to one exemplary embodiment from the perspective of a first UE configured (and/or pre-configured) to perform one or more sidelink transmissions on a plurality of carriers. The first UE may be configured (and/or pre-configured) with a first number of carriers corresponding to a maximum number of carriers that the first UE is able to use concurrently and/or transmit on concurrently. In step 1205, the first UE receives a first sidelink transmission on a first carrier of the plurality of carriers. In step 1210, the first UE derives a first slot for transmitting a first PSFCH based upon a first resource associated with the first sidelink transmission (e.g., the first UE may determine and/or derive to transmit the first PSFCH in the first slot based upon the first resource associated with the first sidelink transmission). In step 1215, the first UE receives a second sidelink transmission on a second carrier of the plurality of carriers. In step 1220, the first UE derives a second slot for transmitting a second PSFCH based upon the second resource associated with the second sidelink transmission (e.g., the first UE may determine and/or derive to transmit the second PSFCH in the second slot based upon the second resource associated with the second sidelink transmission). At least a part of the first slot may overlap with at least a part of the second slot in the time domain. In step 1225, responsive to determining that a number of carriers of a second plurality of carriers associated with derived transmissions of a plurality of PSFCHs exceeds the first number of carriers, the first UE may prioritize the first PSFCH (and/or transmission of the first PSFCH) or the second PSFCH (and/or transmission of the second PSFCH) based upon a rule. The plurality of PSFCHs may comprise the first PSFCH and the second PSFCH. A plurality of slots for transmitting the derived transmissions of the plurality of PSFCHs may be at least partially overlapped in the time domain.

In one embodiment, the first resource associated with the first sidelink transmission may correspond to a resource (e.g., one or more time resources and/or one or more frequency resources) used for delivering the first sidelink transmission.

In one embodiment, the second resource associated with the second sidelink transmission may correspond to a resource (e.g., one or more time resources and/or one or more frequency resources) used for delivering the second sidelink transmission.

In one embodiment, the derived transmissions of the plurality of PSFCHs may be determined and/or derived based upon sidelink transmissions (comprising the first sidelink transmission and/or the second sidelink transmission) received by the first UE.

In one embodiment, the first sidelink transmission is transmitted by a second UE on the first carrier and/or the second sidelink transmission is transmitted by a third UE on the second carrier.

In one embodiment, the second UE is different than the third UE.

In one embodiment, the first PSFCH delivers and/or carries a first HARQ-ACK feedback associated with the first sidelink transmission and/or the second PSFCH delivers and/or carries a second HARQ-ACK feedback associated with the second sidelink transmission.

In one embodiment, the rule is associated with carrier indexes (e.g., an ascending order of carrier indexes) associated with the second plurality of carriers, wherein the first UE prioritizes transmission of the first PSFCH if the first carrier is associated with a carrier index that is lower than a carrier index associated with the second carrier. For example, the rule may define that transmission of a first exemplary PSFCH is prioritized over transmission of a second exemplary PSFCH if a first exemplary carrier associated with the first exemplary PSFCH has a lower carrier index than a second exemplary carrier associated with the second exemplary PSFCH.

In one embodiment, responsive to prioritizing transmission of the first PSFCH, the first UE may perform transmission of the first PSFCH in the first slot to a UE associated with the first sidelink transmission (e.g., the second UE).

In one embodiment, the rule is associated with carrier indexes (e.g., a descending order of carrier indexes) associated with the second plurality of carriers, wherein the first UE prioritizes transmission of the first PSFCH if the first carrier is associated with a carrier index that is higher than a carrier index associated with the second carrier. For example, the rule may define that transmission of a first exemplary PSFCH is prioritized over transmission of a second exemplary PSFCH if a first exemplary carrier associated with the first exemplary PSFCH has a higher carrier index than a second exemplary carrier associated with the second exemplary PSFCH.

In one embodiment, the rule is associated with priority values (e.g., an ascending order of priority values or a descending order of priority values) associated with sidelink transmissions. For example, the rule may define that transmission of a first exemplary PSFCH is prioritized over transmission of a second exemplary PSFCH if a first exemplary sidelink transmission associated with the first exemplary PSFCH is associated with a lower priority value than a second exemplary sidelink transmission associated with the second exemplary PSFCH. Alternatively and/or additionally, the rule may define that transmission of a first exemplary PSFCH is prioritized over transmission of a second exemplary PSFCH if a first exemplary sidelink transmission associated with the first exemplary PSFCH is associated with a higher priority value than a second exemplary sidelink transmission associated with the second exemplary PSFCH.

In one embodiment, the first UE prioritizes transmission of the first PSFCH if the first sidelink transmission is associated with a first priority that is higher than a second priority associated with the second sidelink transmission, wherein the first priority is based upon a first priority value of the priority values and the second priority is based upon a second priority value of the priority values. For example, the rule may define that transmission of a first exemplary PSFCH is prioritized over transmission of a second exemplary PSFCH if a first exemplary sidelink transmission associated with the first exemplary PSFCH is associated with a higher priority than a second exemplary sidelink transmission associated with the second exemplary PSFCH.

In one embodiment, a first sidelink control information is indicative of the first priority and/or the first priority value associated with the first sidelink transmission and/or a second sidelink control information is indicative of the second priority and/or the second priority value associated with the second sidelink transmission. In one embodiment, the first sidelink control information schedules the first sidelink transmission and/or the second sidelink control information schedules the second sidelink transmission.

In one embodiment, the rule is associated with HARQ-ACK contents. In one embodiment, the first UE prioritizes transmission of the first PSFCH if the first HARQ-ACK corresponds to ACK and the second HARQ-ACK corresponds to NACK. For example, the rule may define that transmission of a PSFCH carrying a HARQ-ACK corresponding to ACK is prioritized over transmission of a PSFCH carrying a HARQ-ACK corresponding to NACK.

In one embodiment, the rule is associated with a receiving timing order associated with sidelink transmissions. In one embodiment, the receiving timing order corresponds to an order in which sidelink transmissions are received and/or decoded. In one embodiment, the first UE prioritizes transmission of the first PSFCH if the first sidelink transmission is received before reception of the second sidelink transmission. For example, the rule may define that transmission of a first exemplary PSFCH is prioritized over transmission of a second exemplary PSFCH if a first exemplary sidelink transmission associated with the first exemplary PSFCH is received before a second exemplary sidelink transmission associated with the second exemplary PSFCH is received.

In one embodiment, at least a portion of the first PSFCH overlaps with at least a portion of the second PSFCH in the time domain. For example, a scheduled transmission of the first PSFCH and/or a derived time of transmission of the first PSFCH may overlap at least partially in the time domain with a scheduled transmission of the second PSFCH and/or a derived time of transmission of the second PSFCH. In one embodiment, the plurality of slots are at least partially overlapped in the time domain in an overlapped time period. In one embodiment, the derived transmissions of the plurality of PSFCHs are derived to be performed at least partially in the overlapped time period.

In one embodiment, the first UE prioritizes the first PSFCH and de-prioritizes the second PSFCH (e.g., the first UE does not prioritize the second PSFCH). Responsive to prioritizing the first PSFCH, the first UE may transmit the first PSFCH. The first PSFCH may be transmitted on the first carrier. Responsive to de-prioritizing (and/or not prioritizing) the second PSFCH, the first UE may not transmit the second PSFCH and/or the first UE may not transmit a portion of the second PSFCH that overlaps with the first PSFCH.

In one embodiment, the first UE may prioritize one or more prioritized PSFCHs of the plurality of PSFCHs and/or the first UE may de-prioritize (and/or may not prioritize) one or more de-prioritized (and/or un-prioritized) PSFCHs of the plurality of PSFCHs. The first UE may prioritize the one or more prioritized PSFCHs based upon the rule and/or the first UE may not prioritize the one or more de-prioritized PSFCHs based upon the rule. Responsive to prioritizing the one or more prioritized PSFCHs, the first UE may transmit the one or prioritized PSFCHs. Responsive to de-prioritizing (and/or not prioritizing) the one or more de-prioritized PSFCHs, the first UE may not transmit the one or more de-prioritized PSFCHs. Alternatively and/or additionally, responsive to de-prioritizing (and/or not prioritizing) the one or more de-prioritized PSFCHs, the first UE may not transmit one or more overlapped portions of the one or more de-prioritized PSFCHs (e.g., the one or more overlapped portions of the one or more de-prioritized PSFCHs may correspond to one or more portions of the one or more de-prioritized PSFCHs within the overlapped time period).

Referring back to FIGS. 3 and 4, in one exemplary embodiment of a first UE, the device 300 includes a program code 312 stored in the memory 310. The first UE is configured to perform one or more sidelink transmissions on a plurality of carriers and the first UE is configured with a first number of carriers corresponding to a maximum number of carriers that the first UE is able to use concurrently and/or transmit on concurrently. The CPU 308 could execute program code 312 to enable the first UE (i) to receive a first sidelink transmission on a first carrier of the plurality of carriers, (ii) to derive a first slot for transmitting a first PSFCH based upon a first resource associated with the first sidelink transmission, (iii) to receive a second sidelink transmission on a second carrier of the plurality of carriers, (iv) to derive a second slot for transmitting a second PSFCH based upon a second resource associated with the second sidelink transmission, wherein at least a part of the first slot overlaps with at least a part of the second slot in the time domain, and (v) to prioritize the first PSFCH or the second PSFCH based upon a rule responsive to determining that a number of carriers of a second plurality of carriers associated with derived transmissions of a plurality of PSFCHs exceeds the first number of carriers, wherein the plurality of PSFCHs comprises the first PSFCH and the second PSFCH and wherein a plurality of slots for transmitting the derived transmissions of the plurality of PSFCHs are at least partially overlapped in the time domain. Furthermore, the CPU 308 can execute the program code 312 to perform one, some and/or all of the above-described actions and steps and/or others described herein.

Figure 13:
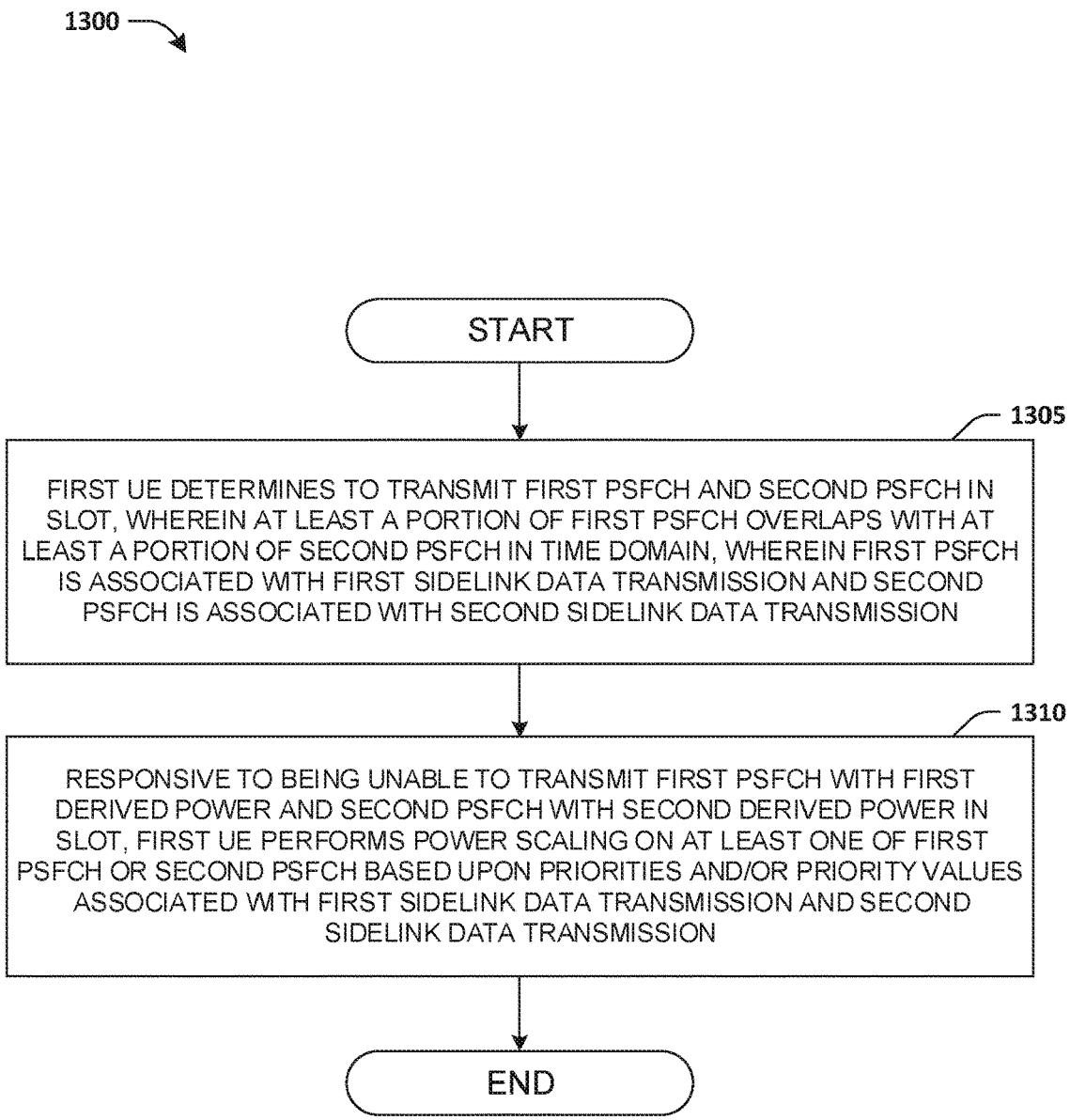
FIG. 13 is a flow chart according to one exemplary embodiment.

FIG. 13 is a flow chart 1300 according to one exemplary embodiment from the perspective of a first UE. In step 1305, the first UE determines (and/or derives) to transmit a first PSFCH and a second PSFCH in a slot. At least a portion of the first PSFCH overlaps with at least a portion of the second PSFCH in the time domain. The first PSFCH is associated with a first sidelink data transmission (e.g., a first sidelink transmission received by the first UE, such as a PSSCH and/or a PSCCH) and the second PSFCH is associated with a second sidelink data transmission (e.g., a second sidelink transmission received by the first UE, such as a PSSCH and/or a PSCCH). In step 1310, responsive to being unable to transmit the first PSFCH with a first derived power and the second PSFCH with a second derived power in the slot, the first UE performs power scaling on the first PSFCH and/or the second PSFCH based upon priorities and/or priority values associated with the first sidelink data transmission and the second sidelink data transmission.

In one embodiment, the first derived power may be derived and/or determined based upon the first sidelink data transmission. In one embodiment, the second derived power may be derived and/or determined based upon the second sidelink data transmission. Alternatively and/or additionally, the first derived power and/or the second derived power may be derived and/or determined based upon a configuration of the first UE and/or based upon power information stored on the first UE (e.g., the power information may be stored as a default setting and/or the power information may be generated based upon one or more selections and/or measurements by the first UE).

In one embodiment, the first UE transmits the first PSFCH with the first derived power and does not transmit the second PSFCH, wherein a first priority value associated with the first sidelink data transmission is lower than a second priority value associated with the second sidelink data transmission. For example, the first UE may transmit the first PSFCH with the first derived power and/or the first UE may not transmit the second PSFCH based upon the first priority value being lower than the second priority value (and/or based upon a first priority associated with the first sidelink data transmission being higher than a second priority associated with the second sidelink data transmission).

In one embodiment, the first UE determines (and/or derives) to transmit the first PSFCH and the second PSFCH in the slot based upon the first sidelink data transmission and the second sidelink data transmission.

Referring back to FIGS. 3 and 4, in one exemplary embodiment of a first UE, the device 300 includes a program code 312 stored in the memory 310. The CPU 308 could execute program code 312 to enable the first UE (i) to determine to transmit a first PSFCH and a second PSFCH in a slot, wherein at least a portion of the first PSFCH overlaps with at least a portion of the second PSFCH in the time domain, wherein the first PSFCH is associated with a first sidelink data transmission and the second PSFCH is associated with a second sidelink data transmission, and (ii) to perform power scaling on at least one of the first PSFCH or the second PSFCH based upon priorities and/or priority values associated with the first sidelink data transmission and the second sidelink data transmission responsive to being unable to transmit the first PSFCH with a first derived power and the second PSFCH with a second derived power in the slot. Furthermore, the CPU 308 can execute the program code 312 to perform one, some and/or all of the above-described actions and steps and/or others described herein.

It may be appreciated that applying one or more of the techniques presented herein may result in one or more benefits including, but not limited to, improving efficiency and/or reducing power consumption by more efficiently handling sidelink feedback collision. For example, by prioritizing transmission of a PSFCH carrying a HARQ-ACK corresponding to ACK over transmission of a PSFCH carrying a HARQ-ACK corresponding to NACK may result in a reduction in retransmissions of sidelink transmissions by UEs expecting to receive HARQ-ACKs.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 10-13. Furthermore, the processor may execute the program code to perform one, some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first user equipment (UE) configured to perform one or more sidelink transmissions on a plurality of carriers and configured with a first number of carriers corresponding to a maximum number of carriers that the first UE is able to at least one of use concurrently or transmit on concurrently, the method comprising:

receiving a first sidelink transmission on a first carrier of the plurality of carriers;

deriving a first slot for transmitting a first Physical Sidelink Feedback Channel (PSFCH) based upon a first resource associated with the first sidelink transmission;

receiving a second sidelink transmission on a second carrier of the plurality of carriers;

deriving a second slot for transmitting a second PSFCH based upon a second resource associated with the second sidelink transmission, wherein at least a part of the first slot overlaps with at least a part of the second slot in a time domain; and responsive to determining that a number of carriers of a second plurality of carriers associated with derived transmissions of a plurality of PSFCHs exceeds the first number of carriers, prioritizing the first PSFCH or the second PSFCH based upon a rule, wherein:
the plurality of PSFCHs comprises the first PSFCH and the second PSFCH; and
a plurality of slots for transmitting the derived transmissions of the plurality of PSFCHs are at least partially overlapped in the time domain.

2. The method of claim 1, wherein at least one of:
the first sidelink transmission is transmitted by a second UE on the first carrier; or the second sidelink transmission is transmitted by a third UE on the second carrier.

3. The method of claim 2, wherein:
the second UE is different than the third UE.

4. The method of claim 1, wherein at least one of:
the first PSFCH at least one of delivers or carries a first Hybrid Automatic Repeat Request-Acknowledgement (HARQ-ACK) feedback associated with the first sidelink transmission; or
the second PSFCH at least one of delivers or carries a second HARQ-ACK feedback associated with the second sidelink transmission.

5. The method of claim 4, wherein:
the rule is associated with HARQ-ACK contents; and
the first UE prioritizes transmission of the first PSFCH if the first HARQ-ACK corresponds to Acknowledgement (ACK) and the second HARQ-ACK corresponds to Negative Acknowledgement (NACK).

6. The method of claim 1, wherein:
the rule is associated with carrier indexes associated with the second plurality of carriers, wherein:
the first UE prioritizes transmission of the first PSFCH if the first carrier is associated with a carrier index that is lower than a carrier index associated with the second carrier; or
the first UE prioritizes transmission of the first PSFCH if the first carrier is associated with a carrier index that is higher than a carrier index associated with the second carrier.

7. The method of claim 1, wherein:
the rule is associated with priority values associated with sidelink transmissions; and
the first UE prioritizes transmission of the first PSFCH if the first sidelink transmission is associated with a first priority that is higher than a second priority associated with the second sidelink transmission, wherein the first priority is based upon a first priority value of the priority values and the second priority is based upon a second priority value of the priority values.

8. The method of claim 7, wherein at least one of:
a first sidelink control information is indicative of at least one of the first priority or the first priority value associated with the first sidelink transmission, wherein the first sidelink control information schedules the first sidelink transmission; or
a second sidelink control information is indicative of at least one of the second priority or the second priority value associated with the second sidelink transmission, wherein the second sidelink control information schedules the second sidelink transmission.

9. The method of claim 1, wherein:
the rule is associated with a receiving timing order associated with sidelink transmissions; and
the first UE prioritizes transmission of the first PSFCH if the first sidelink transmission is received before reception of the second sidelink transmission.

10. The method of claim 1, wherein at least one of:
at least a portion of the first PSFCH overlaps with at least a portion of the second PSFCH in the time domain; or
the plurality of slots are at least partially overlapped in the time domain in an overlapped time period, and the derived transmissions of the plurality of PSFCHs are derived to be performed at least partially in the overlapped time period.

11. The method of claim 1, wherein comprises prioritizing the first PSFCH and de-prioritizing the second PSFCH, the method comprising:
responsive to prioritizing the first PSFCH, transmitting the first PSFCH; and
responsive to de-prioritizing the second PSFCH, at least one of:
not transmitting a portion of the second PSFCH that overlaps with the first PSFCH; or
not transmitting the second PSFCH.

12. A first user equipment (UE) configured to perform one or more sidelink transmissions on a plurality of carriers and configured with a first number of carriers corresponding to a maximum number of carriers that the first UE is able to at least one of use concurrently or transmit on concurrently, the first UE comprising:
a control circuit;
a processor installed in the control circuit; and
a memory installed in the control circuit and operatively coupled to the processor,
wherein the processor is configured to execute a program code stored in the memory to perform operations, the operations comprising:
receiving a first sidelink transmission on a first carrier of the plurality of carriers;
deriving a first slot for transmitting a first Physical Sidelink Feedback Channel (PSFCH) based upon a first resource associated with the first sidelink transmission;
receiving a second sidelink transmission on a second carrier of the plurality of carriers;
deriving a second slot for transmitting a second PSFCH based upon a second resource associated with the second sidelink transmission, wherein at least a part of the first slot overlaps with at least a part of the second slot in a time domain; and
responsive to determining that a number of carriers of a second plurality of carriers associated with derived transmissions of a plurality of PSFCHs exceeds the first number of carriers, prioritizing the first PSFCH or the second PSFCH based upon a rule, wherein:
the plurality of PSFCHs comprises the first PSFCH and the second PSFCH; and
a plurality of slots for transmitting the derived transmissions of the plurality of PSFCHs are at least partially overlapped in the time domain.

13. The first UE of claim 12, wherein at least one of:
the first sidelink transmission is transmitted by a second UE on the first carrier; or
the second sidelink transmission is transmitted by a third UE on the second carrier.

14. The first UE of claim 13, wherein:
the second UE is different than the third UE.

15. The first UE of claim 12, wherein at least one of:
the first PSFCH at least one of delivers or carries a first Hybrid Automatic Repeat Request-Acknowledgement (HARQ-ACK) feedback associated with the first sidelink transmission; or
the second PSFCH at least one of delivers or carries a second HARQ-ACK feedback associated with the second sidelink transmission.

16. The first UE of claim 15, wherein:
the rule is associated with HARQ-ACK contents; and
the first UE prioritizes transmission of the first PSFCH if the first HARQ-ACK corresponds to Acknowledgement (ACK) and the second HARQ-ACK corresponds to Negative Acknowledgement (NACK).

17. The first UE of claim 12, wherein:
the rule is associated with carrier indexes associated with the second plurality of carriers, wherein:
  the first UE prioritizes transmission of the first PSFCH if the first carrier is associated with a carrier index that is lower than a carrier index associated with the second carrier; or
  the first UE prioritizes transmission of the first PSFCH if the first carrier is associated with a carrier index that is higher than a carrier index associated with the second carrier.

18. The first UE of claim 12, wherein:
the rule is associated with priority values associated with sidelink transmissions; and
the first UE prioritizes transmission of the first PSFCH if the first sidelink transmission is associated with a first priority that is higher than a second priority associated with the second sidelink transmission, wherein the first priority is based upon a first priority value of the priority values and the second priority is based upon a second priority value of the priority values.

19. The first UE of claim 18, wherein at least one of:
a first sidelink control information is indicative of at least one of the first priority or the first priority value associated with the first sidelink transmission, wherein the first sidelink control information schedules the first sidelink transmission; or
a second sidelink control information is indicative of at least one of the second priority or the second priority value associated with the second sidelink transmission, wherein the second sidelink control information schedules the second sidelink transmission.

20. The first UE of claim 12, wherein:
the rule is associated with a receiving timing order associated with sidelink transmissions; and
the first UE prioritizes transmission of the first PSFCH if the first sidelink transmission is received before reception of the second sidelink transmission.

* * * * *